(12) United States Patent
Dann et al.

(10) Patent No.: US 7,264,687 B2
(45) Date of Patent: Sep. 4, 2007

(54) APPARATUS AND METHOD FOR MAKING FABRIC FOR COVERINGS FOR ARCHITECTURAL OPENINGS

(75) Inventors: Kevin M. Dann, Denver, CO (US); Ralph G. Jelic, Boulder, CO (US); Michael J. Siebenaller, Broomfield, CO (US); Thomas E. Sevcik, Fort Lupton, CO (US); William L. Teter, Westminster, CO (US); Joseph E. Kovach, Denver, CO (US); Douglas W. Christensen, Milliken, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 0 days.

(21) Appl. No.: 11/458,242

(22) Filed: Jul. 18, 2006

(65) Prior Publication Data
US 2007/0023119 A1 Feb. 1, 2007

Related U.S. Application Data

(60) Provisional application No. 60/702,715, filed on Jul. 26, 2005.

(51) Int. Cl.
*B32B 7/04* (2006.01)
(52) U.S. Cl. .................... 156/269; 156/512
(58) Field of Classification Search .......... 160/84.04, 160/84.05, 236; 156/197, 250, 91, 442.2, 156/502, 510, 512
See application file for complete search history.

(56) References Cited

U.S. PATENT DOCUMENTS

| | | | |
|---|---|---|---|
| RE22,311 E | | 5/1943 | Roy |
| 3,017,178 A | * | 1/1962 | Brickle .................... 271/278 |
| RE26,444 E | * | 8/1968 | Paige ......................... 428/12 |
| 5,313,999 A | * | 5/1994 | Colson et al. ........... 160/121.1 |
| 5,630,900 A | * | 5/1997 | Huang ....................... 156/227 |
| 5,791,390 A | | 8/1998 | Watanabe |
| 5,894,709 A | * | 4/1999 | Fosshage .................... 53/450 |
| 6,033,504 A | | 3/2000 | Judkins |
| 6,103,336 A | * | 8/2000 | Swiszcz ..................... 428/116 |
| 6,527,895 B1 | * | 3/2003 | Palmer ....................... 156/197 |
| 6,572,725 B2 | | 6/2003 | Goodhue |
| 2002/0043347 A1 | | 4/2002 | Rupel |
| 2004/0065416 A1 | * | 4/2004 | Auger et al. ............. 160/84.05 |

FOREIGN PATENT DOCUMENTS

| EP | 747311 A2 * | 12/1996 |
|---|---|---|
| WO | WO 2005/062875 A2 | 7/2005 |
| WO | WO 2005/062875 A3 | 7/2005 |
| WO | WO 2005062875 A2 * | 7/2005 |

* cited by examiner

*Primary Examiner*—Jeff H. Aftergut
*Assistant Examiner*—Daniel McNally
(74) *Attorney, Agent, or Firm*—Dorsey & Whitney LLP

(57) ABSTRACT

The present invention is an apparatus for forming a fabric for an architectural opening covering. The apparatus comprises a joining section, an accumulator, a cutting station, and a stacker. The joining section is configured to join together first, second, third and fourth material strips into a fabric strip. The accumulator is configured to accumulate the fabric strip upon leaving the joining section. The cutting station is configured to sever the fabric strip into an upstream fabric strip and a first downstream fabric strip. The stacker is configured to join the first downstream fabric strip with a second downstream fabric strip to form the fabric.

24 Claims, 27 Drawing Sheets

APPARATUS AND METHOD FOR MAKING FABRIC FOR COVERINGS FOR ARCHITECTURAL OPENINGS

CROSS-REFERENCE TO RELATED APPLICATION

The present application claims the benefit under 35 U.S.C. § 119(e) to U.S. Provisional Patent Application No. 60/702,715 ("the '715 application"), which was filed on Jul. 26, 2005 and entitled "Apparatus and Method for Making Fabric For Coverings for Architectural Openings." The '715 application is incorporated by reference into the present application in its entirety.

The present invention relates generally to devices and methods for the formation of fabrics. More specifically, the present invention relates generally to devices and methods for the formation of fabrics used in designer coverings for architectural openings such as windows, doors, archways, and the like.

BACKGROUND OF THE INVENTION

Coverings for architectural openings such as windows, doors, archways, and the like, have taken numerous forms over a long period of time. Coverings might simply constitute a fabric draped across a rod or other support in a permanent position, but more popular coverings constitute retractable shades, fabrics, or the like.

A popular covering used in architectural openings is a Venetian blind wherein a plurality of horizontally disposed slats are supported on tape or cord ladders so they can be rotated about their longitudinal axes between open and closed positions or retracted and extended across the opening in retracted and extended positions. Vertical blinds are similar to Venetian blinds except the slats extend vertically rather than horizontally. More recently, cellular shades have become very popular, as they are not only aesthetically attractive but also insulative. Numerous forms of cellular shades have recently been developed and this has led to more interest in retractable fabric shades such as of the Roman Shade variety.

A variation of a Roman shade is disclosed in International Patent Application PCT/US2004/043043, which is of common ownership with the present application, was filed internationally Dec. 21, 2004, is entitled "Retractable Shade For Coverings For Architectural Openings" and is hereby incorporated by reference in its entirety. In that application, the covering for an architectural opening includes a fabric formed from a plurality of rigid or semi-rigid elongated slats or vane strips of arcuate transverse cross-section that are supported on a flexible support structure and suspended in an architectural opening for movement between extended and retracted positions.

In the extended position, the slats or vanes slightly overlap each other while presenting a multi-curved sheet-like appearance. In a retracted position, the slats or vanes are gathered on their supporting structure adjacent a head rail for the covering along the top of the architectural opening. The slats or vanes can be supported on various support structures which might be, by way of example, a sheet of sheer fabric, a plurality of vertically extended cords or micro fibers, or interconnected strips of flexible material (e.g., webbing) allowing the slats to hang or droop downwardly in a generally vertical plane.

There is a need in the art for an apparatus for forming the fabric used in the aforementioned covering. There is also a need in the art for a process of forming the fabric used in the aforementioned covering.

BRIEF SUMMARY OF THE INVENTION

The present invention, in one embodiment, is an apparatus for forming a fabric for an architectural opening covering. The apparatus comprises a joining section, an accumulator, a cutting station, and a stacker. The joining section is configured to join together first, second, third and fourth material strips into a fabric strip. The accumulator is configured to accumulate the fabric strip upon leaving the joining section. The cutting station is configured to sever the fabric strip into an upstream fabric strip and a first downstream fabric strip. The stacker is configured to join the first downstream fabric strip with a second downstream fabric strip to form the fabric.

In one embodiment, the joining section comprises a joining roller and first, second, third and fourth rollers for holding, respectively, rolls of the first, second, third and fourth material strips. The first, second, third and fourth material strips are joined together about the joining roller to form the fabric strip.

In one embodiment, the joining section comprises three gluing stations. The first gluing station applies a glue bead to the first material strip prior to said strip encountering the joining roller. The second gluing station applies a pair of glue beads to the second material strip prior to said strip encountering the joining roller. The third gluing station applies a glue bead to the fabric strip upon leaving the joining roller.

In one embodiment, the cutting station comprises an air jet nozzle, a knife and a knife block. The air jet nozzle applies a flow of air against the fabric strip such that the flow of air maintains the fabric strip against the knife block. The knife acts against the knife block to sever the fabric strip into the upstream fabric strip and the first downstream fabric strip. The upstream fabric strip extends from the cutting station, through the accumulator, and into the joining section. The first downstream fabric strip extends from the cutting station into the stacker.

In one embodiment, the stacker comprises a vacuum belt, an elevator and a pin rack mounted on the elevator. The vacuum belt transports the first downstream fabric strip. The elevator brings the second fabric strip into contact with the first fabric strip. The pin rack impales the fabric strips together as they bond to form the fabric.

The present invention, in one embodiment, is a method of forming a fabric for an architectural opening covering. The method comprises joining together first, second, third and fourth material strips into a fabric strip and then accumulating the fabric strip as the fabric strip leaves the joining section. The method further comprises severing the fabric strip into an upstream fabric strip and a first downstream fabric strip and then stacking and connecting the first downstream fabric strip with a second downstream fabric strip to form the fabric.

In one embodiment, the first, second, third and fourth material strips are provided, respectively, on first, second, third and fourth rolls. The first, second, third and fourth material strips are then joined about a joining roller to form the fabric strip.

In one embodiment, a glue bead is applied to the first material strip prior to said strip encountering the joining roller. A pair of glue beads is applied to the second material strip prior to said strip encountering the joining roller. A fourth glue bead is applied to the fabric strip upon the fabric strip leaving the joining roller.

In one embodiment, a flow of air is applied against the fabric strip. The flow of air maintains the fabric strip against a knife block.

In one embodiment, the first downstream fabric strip is transported via a vacuum belt. The second fabric strip is elevated into contact with the first fabric strip. The fabric strips are impaled together as they bond to form the fabric.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 4b is an end elevation of the fabric used in the covering depicted in FIG. 4a, as viewed along arrow A in FIG. 4a.

DETAILED DESCRIPTION OF THE INVENTION a. Overview of Machine and Process

Figure 1:
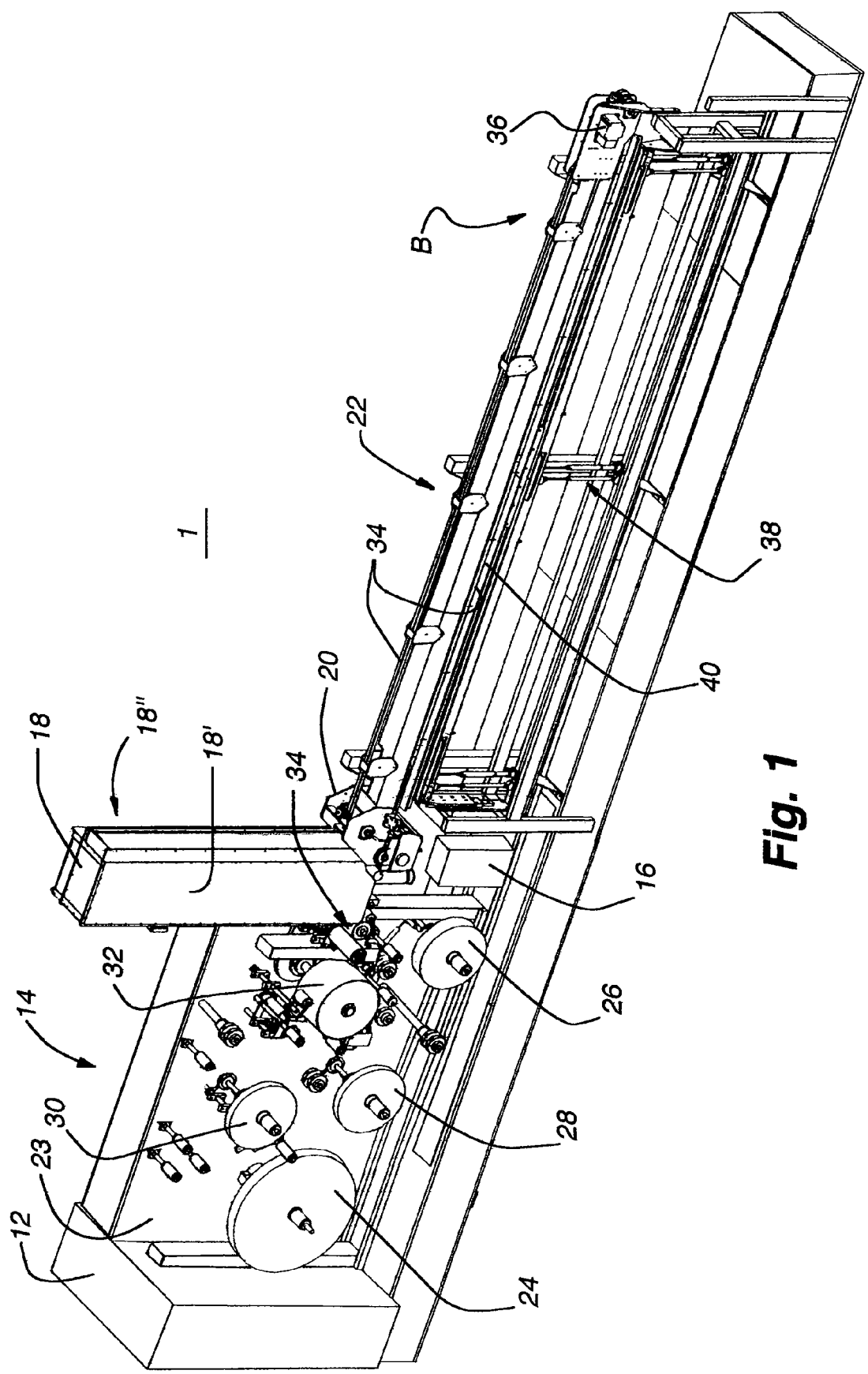
FIG. 1 is a front isometric view of the machine.
Figure 2:
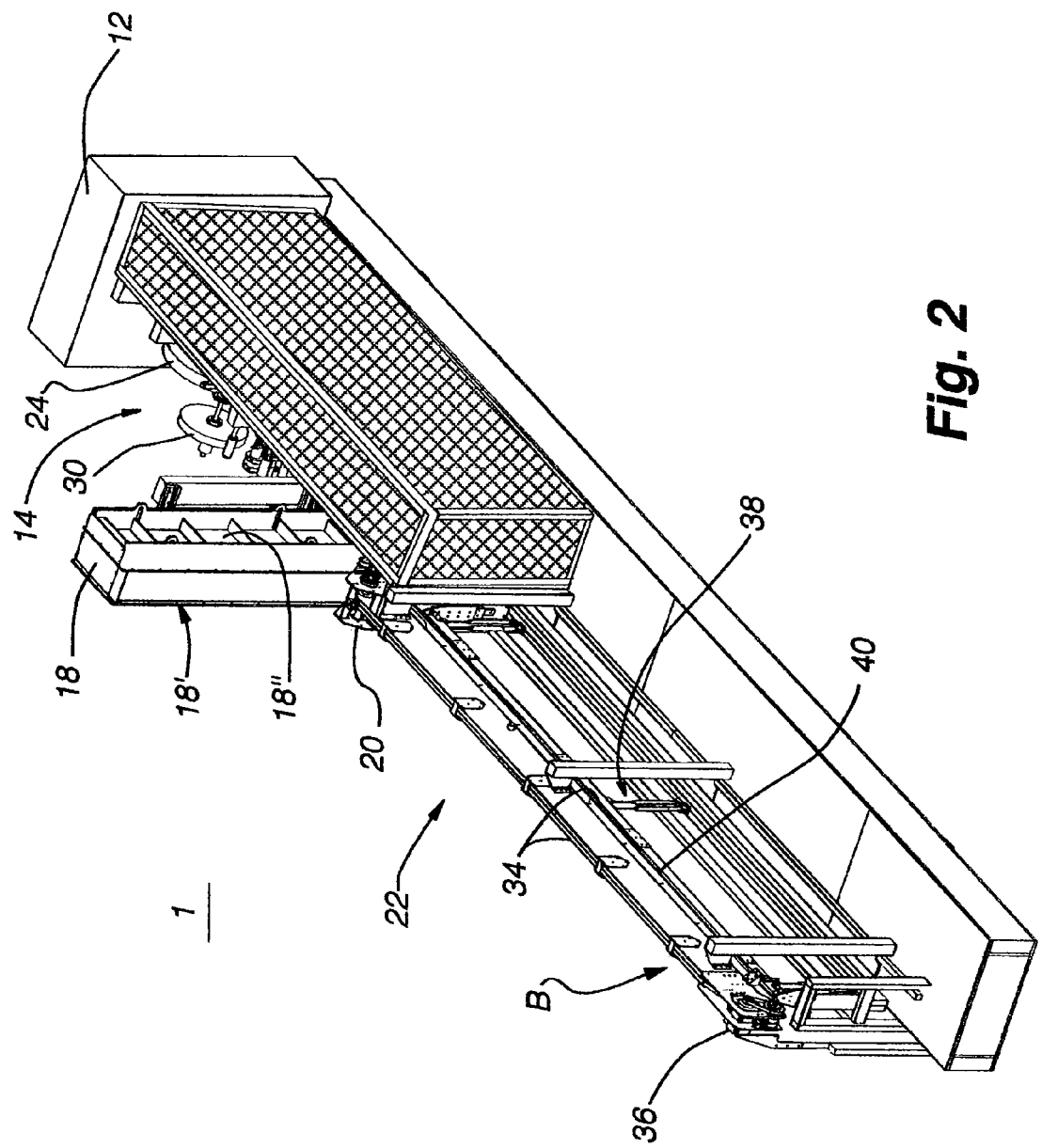
FIG. 2 is a rear isometric view of the machine.
Figure 3:
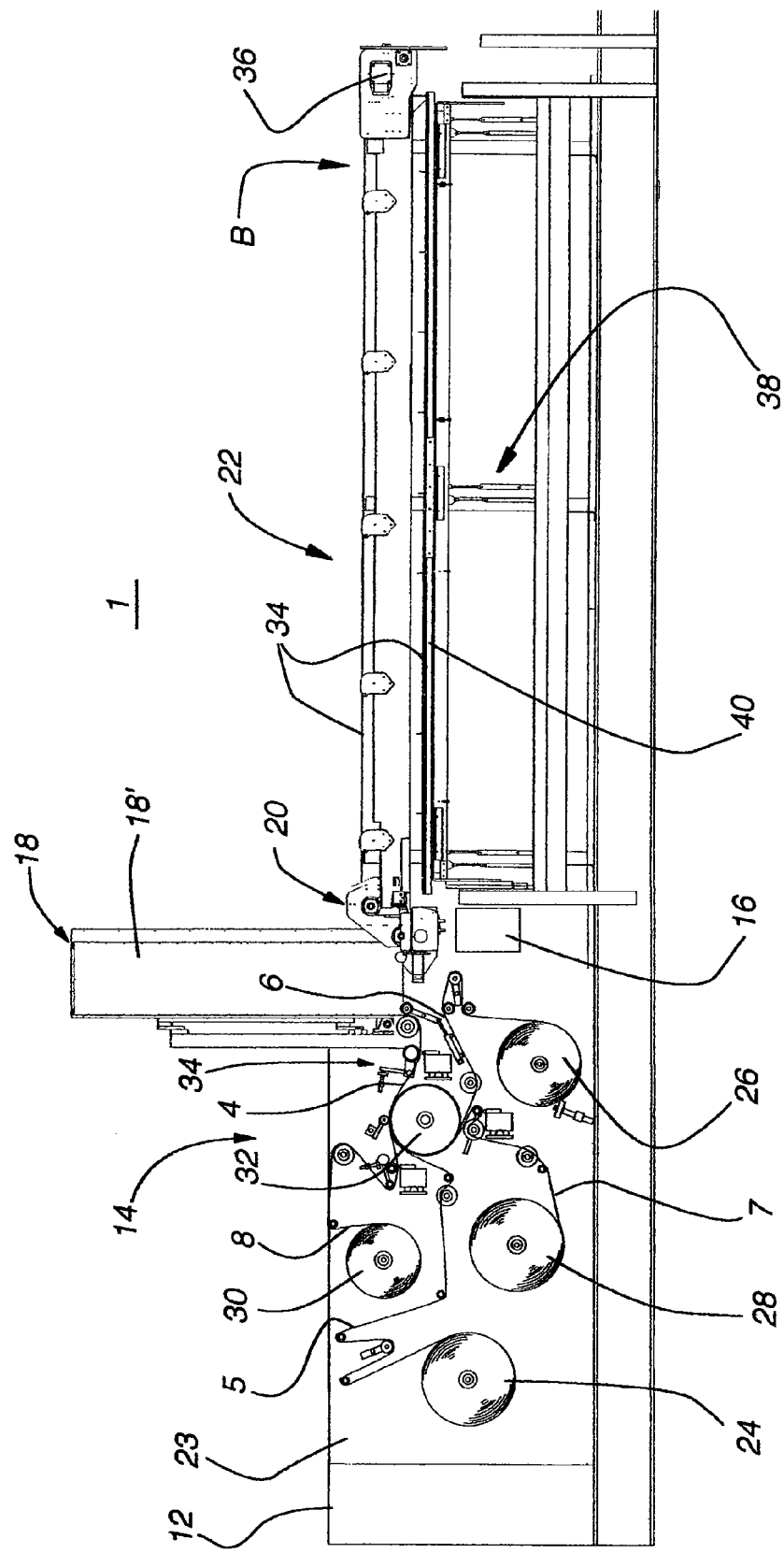
FIG. 3 is a front elevation of the machine.
Figure 4A:
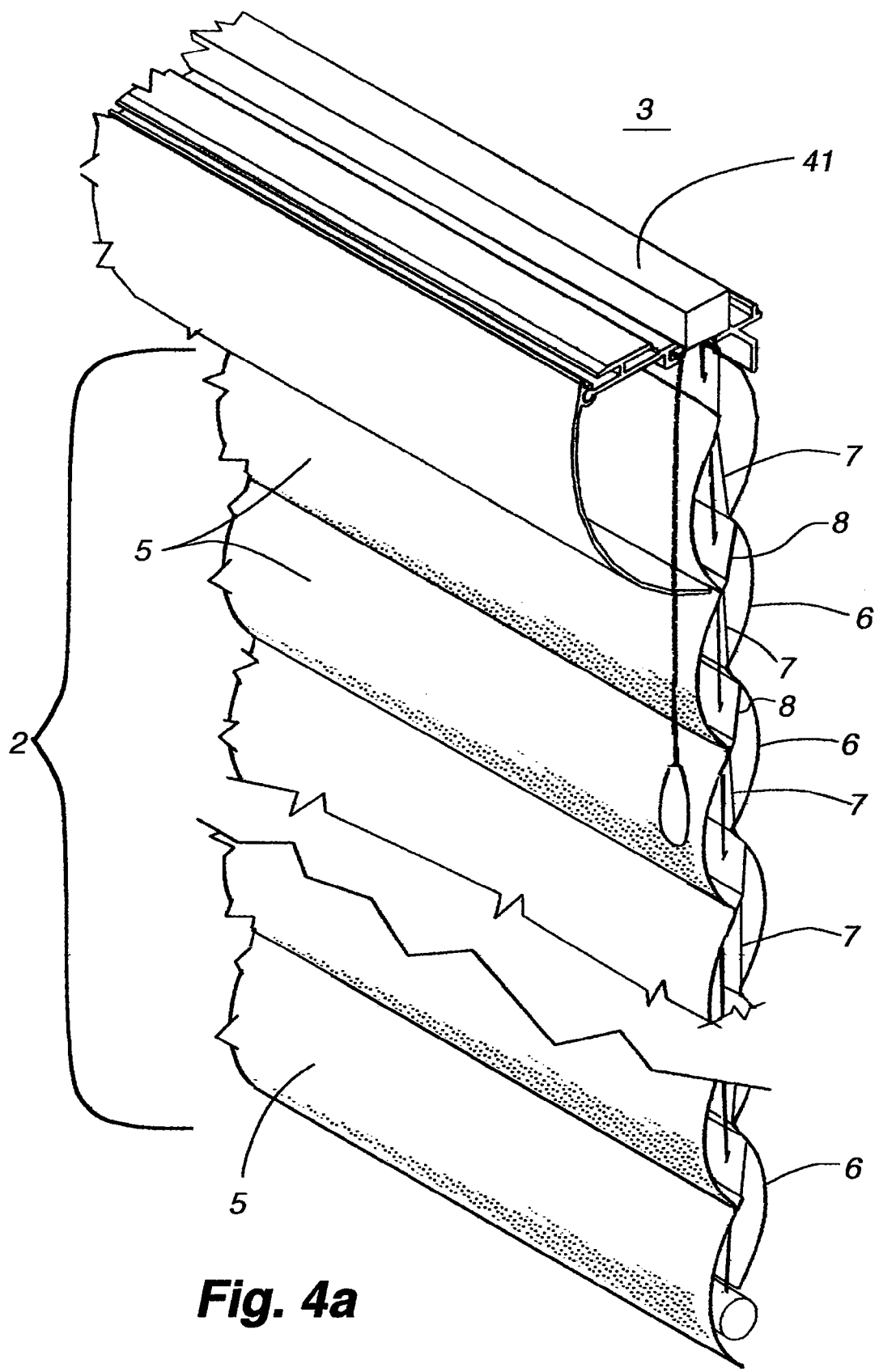
FIG. 4a is an isometric view of a covering for an architectural opening wherein the covering employs the fabric manufactured by the machine.
Figure 4B:
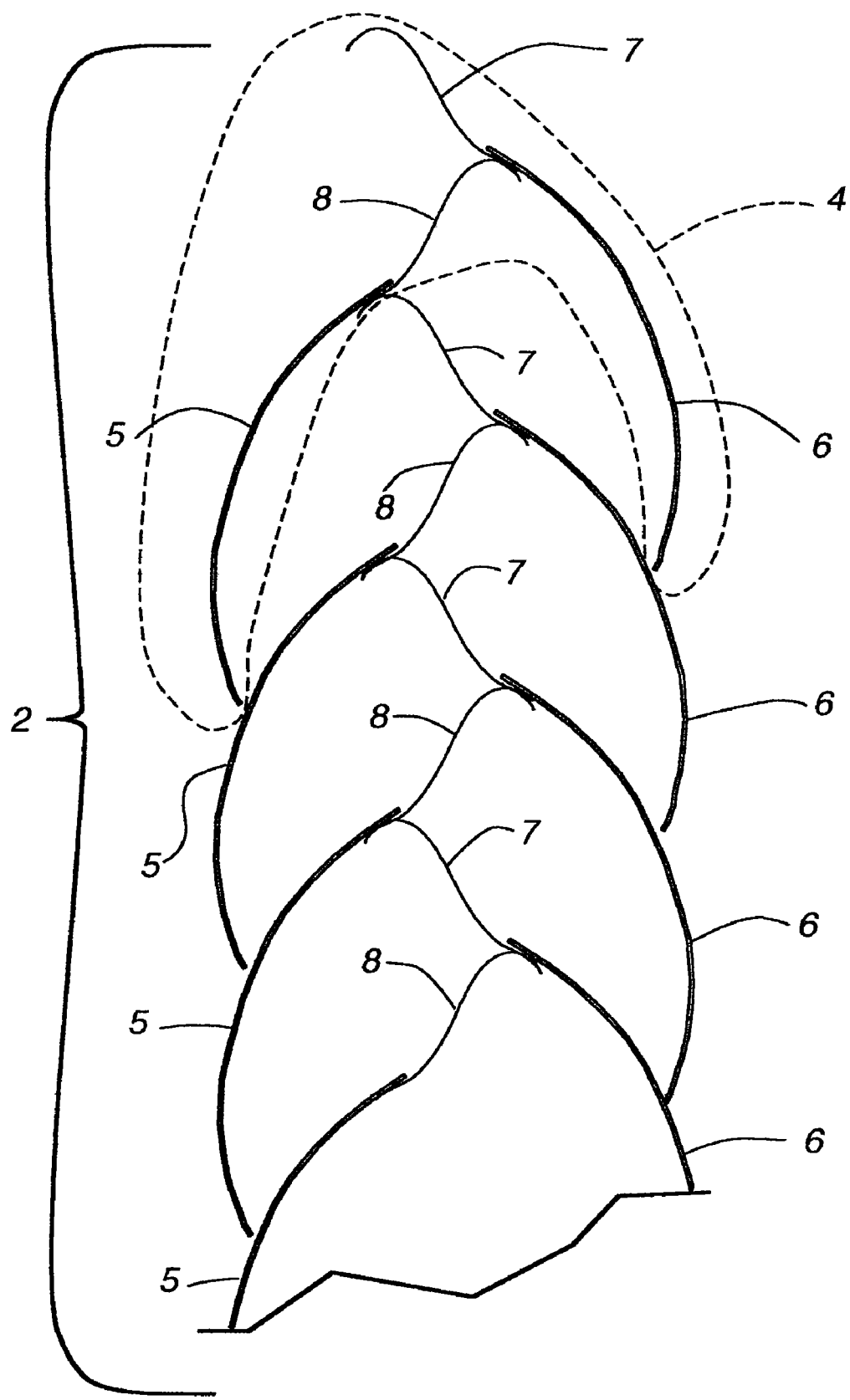

The present invention, in one embodiment, is a machine 1 and process for making fabric 2 that is used in coverings 3 for architectural openings. For a general overview of the machine 1 and process of the subject invention and the fabric 2 made thereby, reference is made to FIGS. 1-4b. FIG. 1 is a front isometric view of the machine 1. FIG. 2 is a rear isometric view of the machine 1. FIG. 3 is a front elevation of the machine 1. FIG. 4a is an isometric view of a covering 3 for an architectural opening wherein the covering 3 employs a fabric 2 manufactured by the machine 1. FIG. 4b is an end elevation of the fabric 2 used in the covering 3 depicted in FIG. 4a, as viewed along arrow A in FIG. 4a.

The machine 1 and process are advantageous because they make it possible to join four continuous strips of fabric-type materials into a continuous wing or fabric strip 4, which is severed into segments and combined to form the fabric 2 that is used in the covering 3 depicted in FIGS. 4*a* and 4*b*. The four continuous strips of fabric type materials used to form the continuous fabric strip 4 are a back vane strip 5, a front vane strip 6, a flip web strip 7, and a joining web strip 8. In one embodiment, the fabric-type material used for the flip and joining web strips 7, 8 is 35 gram Unitika, as manufactured by Unitika Ltd. of 4-1-3 Kyutaromachi, Chuo-ku, Osaka 541, Japan. In one embodiment, the fabric-type material used for the back and front vane strips 5, 6 is as disclosed in the accompanying patent application entitled "Method and Apparatus For Forming Vanes For Fabric In Coverings For Architectural Openings", which is of common ownership with the present application, marked "EXHIBIT Z", and hereby incorporated by reference in its entirety.

FIGS. 4*a* and 4*b* illustrate the relationship of the various strips 4, 5, 6, 7, 8 when joined together to form the fabric 2 of the covering 3. For more detail regarding the covering 3 depicted in FIGS. 4*a* and 4*b*, refer to International Patent Application PCT/US2004/043043, which is of common ownership with the present application, was filed internationally Dec. 21, 2004, is entitled "Retractable Shade For Coverings For Architectural Openings" and is hereby incorporated by reference in its entirety.

As indicated in FIGS. 1-3, the machine 1 includes a control cabinet 12, a joining section 14, a control/operator interface 16, a vacuum dancer or accumulator 18, a cutting station 20 and a stacker 22. The joining section 14 includes an equipment supporting back wall 23 and holds four rolls 24, 26, 28, 30. Each roll holds one of the fabric-type strips 5, 6, 7, 8 used to form the continuous fabric strip 4. The rolls are a back vane roll 24, a front vane roll 26, a flip web roll 28 and a joining web roll 30. The strips 5, 6, 7, 8 of fabric-type materials held on these four rolls 24, 26, 28, 30 are fed in four continuous strips from their respective rolls, about various rollers and tension sensors, through various glue stations, eventually passing about a main or joining roller 32 wherein all four strips 5, 6, 7, 8 are joined together to form the single continuous fabric strip 4.

Once the fabric strip 4 has left the joining roller 32, the fabric strip passes through a final glue station 34 where a final glue bead is continuously applied to the fabric strip 4, which then leaves the joining section 14 to enter the accumulator 18. The fabric strip 4 passes from the accumulator 18, through the cutting station 20 and into the stacker 22. The fabric strip 4 is extended along the length of the stacker 22 via an endless vacuum belt 34 that runs the length of the stacker 22 and is powered by a servomotor 36 at the far end of the stacker 22.

When the leading end edge of the fabric strip 4 reaches a point B near the far end of the stacker 22, the vacuum belt 34 pauses as the fabric strip 4 is severed in the cutting station 20 into an upstream portion 4' (i.e., the length of the fabric strip 4 running in a continuous strip from the cutting station 20, through the accumulator 18 and into the joining section 14) and a downstream portion 4" (i.e., the length of the fabric strip 4 running in a continuous strip from the cutting station 20 and along the length of the stacker 22). Once the fabric strip 4 is severed, the vacuum belt 34 resumes movement to finish transporting the downstream fabric strip 4" to the end of stacker 22. However, while the vacuum belt 32 resumes movement, a back roller in the cutting station 20, which is responsible for feeding the fabric strip 4 from the accumulator 18, through the cutting station 20 and onto the vacuum belt 32, does not resume operation. As a result, the upstream fabric strip 4' begins to accumulate in the accumulator 18.

Once the downstream fabric strip 4" reaches the end of the stacker 22, the vacuum belt 34 pauses again while an elevator 38 raises a pin rack 40 to impale the downstream fabric strip 4" against the vacuum belt 34. Another downstream fabric strip 4", which was earlier deposited on the pin rack 40 via the same process, is brought into contact with the downstream fabric strip 4" currently suspended from the vacuum belt 34. This causes the two downstream fabric strips 4" to be joined together via the final glue bead. The elevator 38 descends from the vacuum belt 34 with the joined downstream fabric strips 4" impaled on the pin rack 40.

Once the elevator 38 has begun to descend, the back roller in the cutting station 20 resumes rotation to feed the upstream fabric strip 4' accumulating in the accumulator 18 through the cutting station 20 and onto the vacuum belt 34 of the stacker 22. Once the fabric strip 4 reaches point B, the nip roller in the cutting station 20 and the vacuum belt 34 both stop, the fabric strip 4 is cut via the cutting station 20, and the aforementioned process continues as outlined above, such that another downstream fabric strip 4" is joined to those already joined on the pin rack 40.

Once a sufficient number of downstream fabric strips 4" have been joined together on the pin rack 40 to form a fabric 2 (see FIGS. 4*a* and 4*b*), the pin rack 40 is removed from the stacker 22 with the fabric 2 impaled thereon. The pin rack 40 and fabric 2 impaled thereon are placed as a unit into a humidity chamber for curing the glue used in the final glue bead. The humidity chamber is maintained at approximately 80° F. and 80-90% relative humidity. The pin rack 40 and fabric 2 impaled thereon are held in the humidity chamber under these conditions for approximately one hour. Once, the glue is properly cured, the pin rack 40 and fabric 2 impaled thereon are removed from the humidity chamber. After approximately 24 hours, the fabric 2 is removed from the pin rack 40. The fabric 2 is then ready for attachment to a head rail mechanism 41 to create a covering 3 for an architectural opening, as depicted in FIG. 4*a*.

b. The Joining Section

Figure 5:
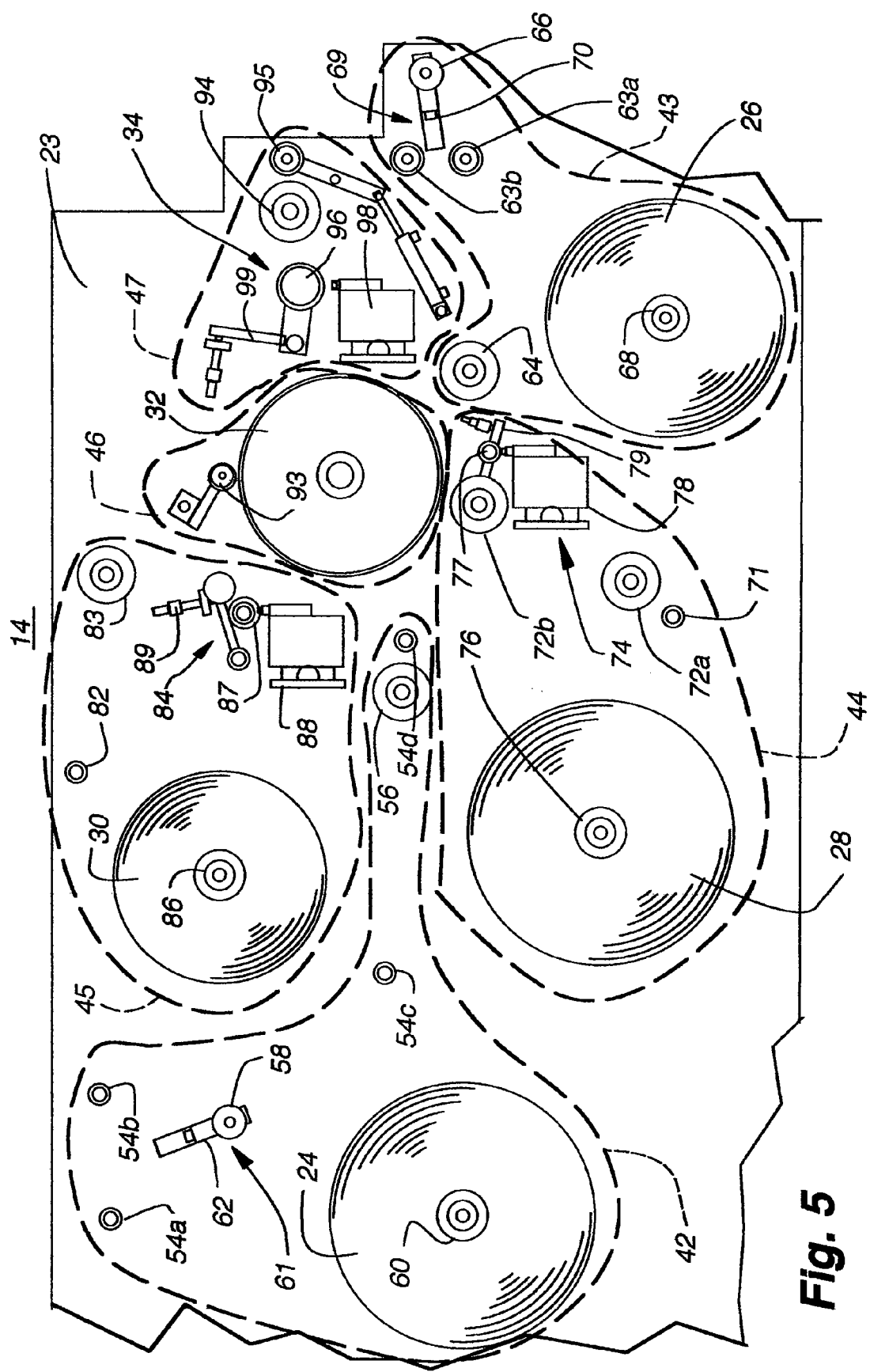
FIG. 5 is an enlarged front elevation of the joining section with dashed lines provided about each related group of components.
Figure 6:
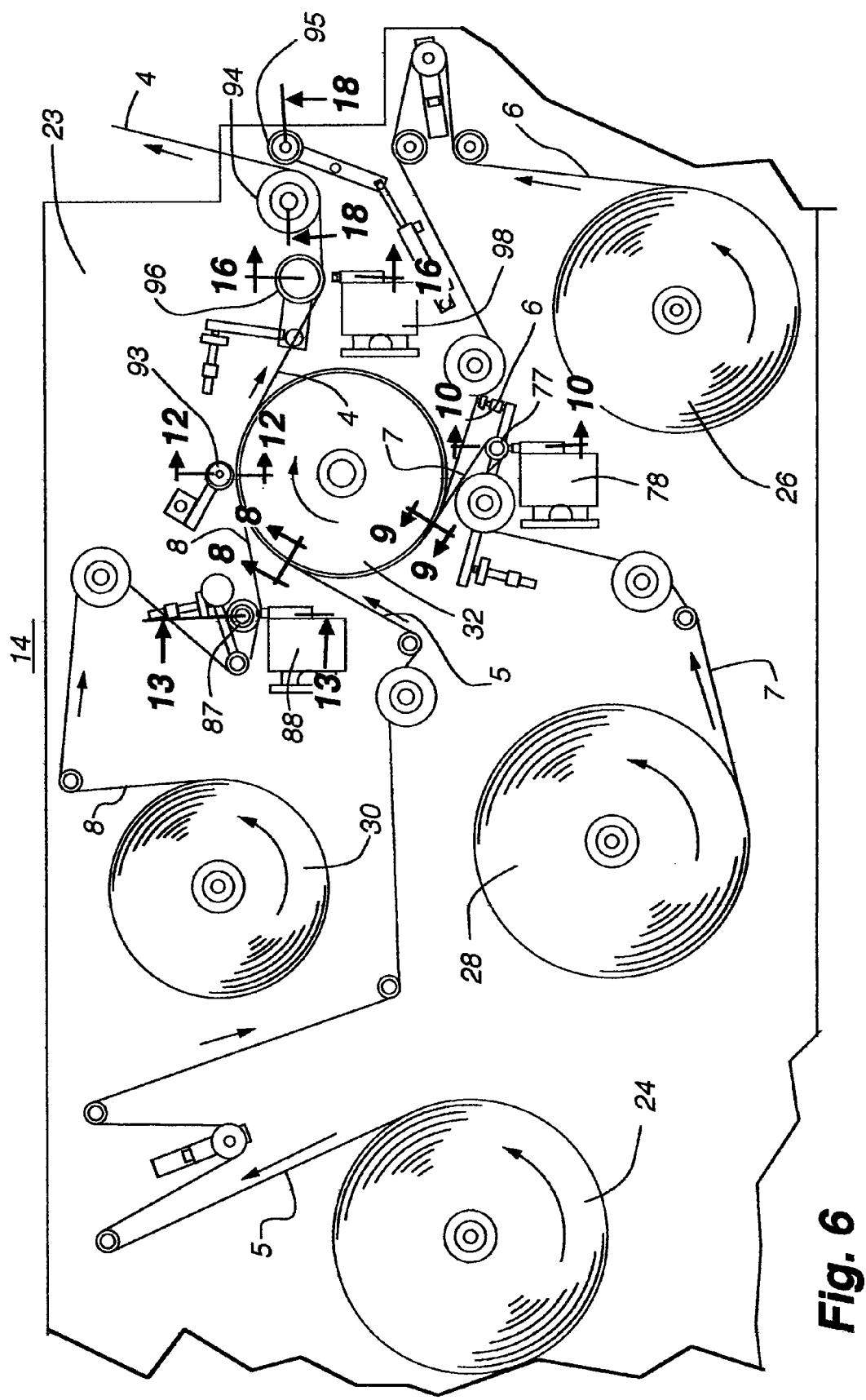
FIG. 6 is the same view depicted in FIG. 5, except it illustrates the pathways of the web and vane strips through the joining section.
Figure 7:
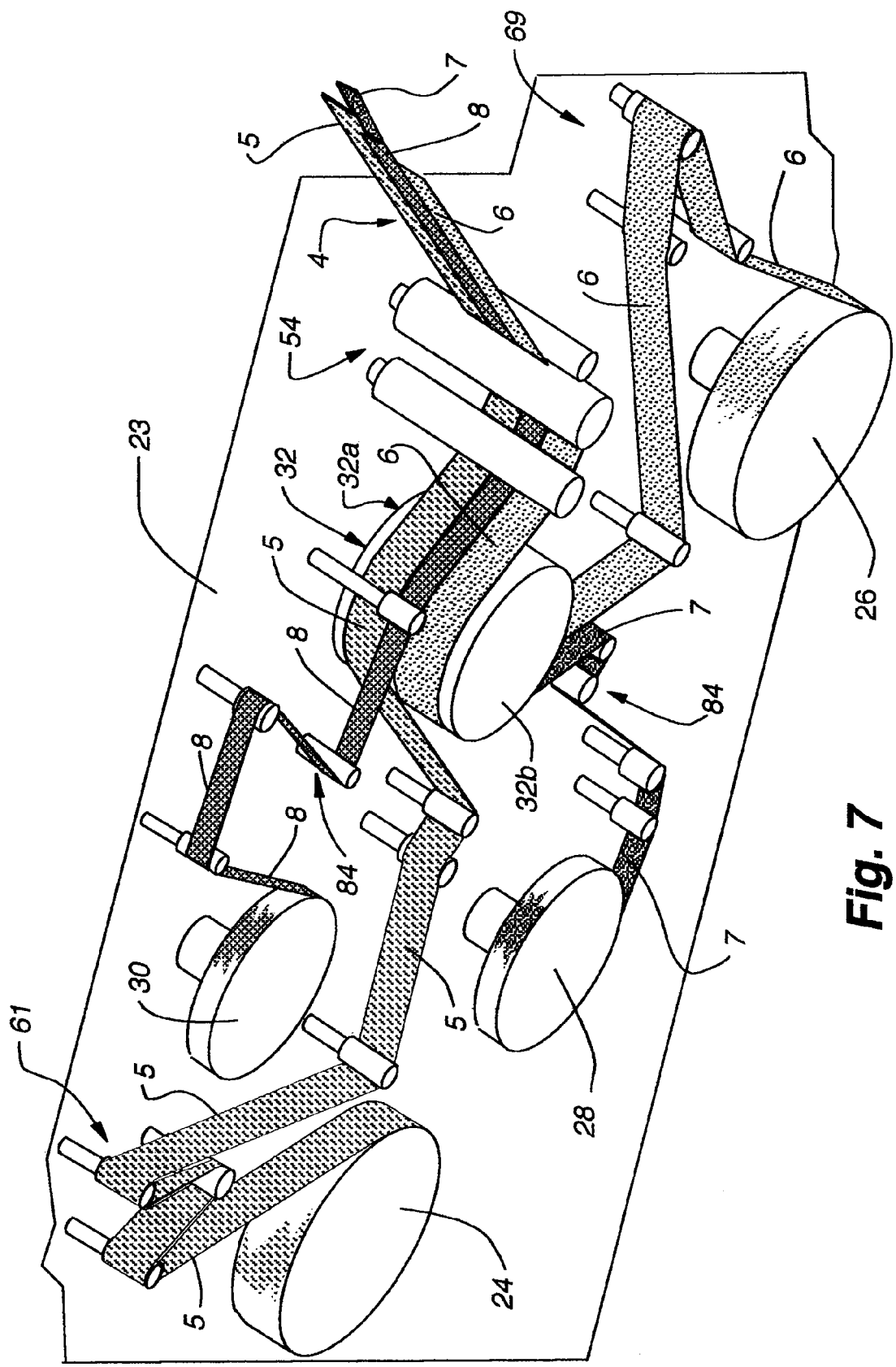
FIG. 7 is an isometric view of the components of the joining section illustrating the relationship of the various rolls and the pathways of the web and vane strips through the joining section.

For a detailed discussion regarding the joining section 14 and the components comprising this section, reference is made to FIGS. 5-7. FIG. 5 is an enlarged front elevation of the joining section 14 with dashed lines provided about each related group of components. FIG. 6 is the same view depicted in FIG. 5, except it illustrates the pathways of the web, vane and fabric strips 4, 5, 6, 7, 8 through the joining section 14. FIG. 7 is a isometric view of the components of the joining section 14 illustrating the relationship of the various rolls 24, 26, 28, 30 and the pathways of the web, vane and fabric strips 4, 5, 6, 7, 8 through the joining section 14.

As shown in FIG. 5, in one embodiment, the machine 1 includes six component groups, which are supported off of the back wall 23. The six component groups are the back vane group 42, the front vane group 43, the flip web group 44, the joining web group 45, the joining roller group 46, and the final gluing station group 47. As indicated in FIG. 6, the back vane group 42, the front vane group 43, the flip web group 44, and the joining web group 45 serve to guide their respective continuous strips (i.e., the back vane strip 5, the front vane strip 6, the flip web strip 7, and the joining web strip 8) to the joining roller group 46 where the four strips 5, 6, 7, 8 are joined together to form a fabric strip 4 that extends through the final gluing station 47 and into the accumulator 18. The final gluing station 47 applies the final glue bead to the fabric strip 4 prior to the fabric strip 4 passing on to the accumulator 18 and the stacker 22 (see FIGS. 1-3). As discussed in the "Overview" subsection of the Detailed Description, the final glue bead is used to join each downstream fabric strip 4" to a downstream fabric strip 4" already on the pin rack 40 on the elevator 38 (see FIGS. 1-3).

As indicated in FIG. 5, the back vane group 42 includes four idler rollers 54a, 54b, 54c, 54d, one fixed guide 56, a tension sensor roller 58 and a back vane roll roller 60 for rotatably supporting the back vane roll 24. Two of the idler rollers 54a, 54b and the tension sensor roller 58 combine to form a tension sensor arrangement 61. The tension sensor roller 58 is coupled to a Model CL 115 tension sensor 62 as manufactured by MAGPOWR Corporation of Oklahoma City, Okla.

As shown in FIG. 6, the back vane strip 5 extends in a continuous strip from the back vane roll 24 to the main or joining roller 32. As indicated in FIG. 7 and more clearly indicated in FIG. 8, which is a cross-section through the outer circumferential surface of the joining roller 32 as taken along section line 8-8 in FIG. 6 where the back vane strip 5 first encounters the joining roller 32, the back vane strip 5 is laid down on the joining roller 32 in such a manner that the back vane strip 5 is closer to the back face 32a of the joining roller 32 than any of the other three strips 6, 7, 8, which already have been or will be laid down on the joining roller 32.

The back vane roller 60 is magnetically clutched to control the tension in the back vane strip 5 between the back vane roller 60 and the joining roller 32. The tension sensor arrangement 61 monitors the tension in the back vane strip 5. Tension readings from the tension sensor 62 are used to determine the magnetic clutch setting for the back vane roller 60. In one embodiment, the magnetic clutch is operated such that the tension in the back vane strip 5 is approximately seven to eight times the tension in the flip web strip 7 or the joining web strip 8. The idler rollers 54a, 54d, 54c, 54d freely rotate about their respective axes and serve to guide the back vane strip 5 on its path to the joining roller 32. The fixed guide 56 does not rotate and maintains the back vane strip 5 in proper lateral alignment with the joining roller 32.

As illustrated in FIG. 5, the front vane group 43 includes two idler rollers 63a, 63b, a fixed guide 64, a tension sensor roller 66, and a front vane roll roller 68 for rotatably supporting the front vane roll 26. The two rollers 63a, 63b and the tension sensor roller 66 combine to form a tension sensor arrangement 69. The tension sensor roller 66 is coupled to a Model CL 115 tension sensor 70 as manufactured by MAGPOWR Corporation of Oklahoma City, Okla.

As shown in FIG. 6, the front vane strip 6 extends in a continuous strip from the front vane roll 26 to the main or joining roller 32. As indicated in FIG. 7 and more clearly indicated in FIG. 9, which is a cross-section through the outer circumferential surface of the joining roller 32 as taken along section line 9-9 in FIG. 6 where the front vane strip 6 first encounters the joining roller 32, the front vane strip 6 is laid down on the joining roller 32 in such a manner that the front vane strip 6 is closer to the front face 32b of the joining roller 32 than any of the other three strips 5, 7, 8 that will be laid down on the joining roller 32. The front vane roller 68 is magnetically clutched to control the tension in the front vane strip 6 between the front vane roller 68 and the joining roller 32. The tension sensor arrangement 69 monitors the tension in the front vane strip 6. Tension readings from the tension sensor 70 are used to determine the magnetic clutch setting for the front vane roller 68. In one embodiment, the magnetic clutch is operated such that the tension in the front vane strip 6 is approximately seven to eight times the tension in the flip web strip 7 or the joining web strip 8. The idler rollers 63a, 63b freely rotate about their respective axes and serve to guide the front vane strip 6 on its path to the joining roller 32. The fixed guide 64 does not rotate and maintains the front vane strip 6 in proper lateral alignment with the joining roller 32.

As indicated in FIG. 5, the flip web group 44 includes an idler roller 71, two fixed guides 72a, 72b, a first gluing station 74, and a flip web roll roller 76 for rotatably supporting the flip web roll 28. The first gluing station 74 includes a mash roller 77, a glue applicator 78 and an adjustor 79.

Figure 9:
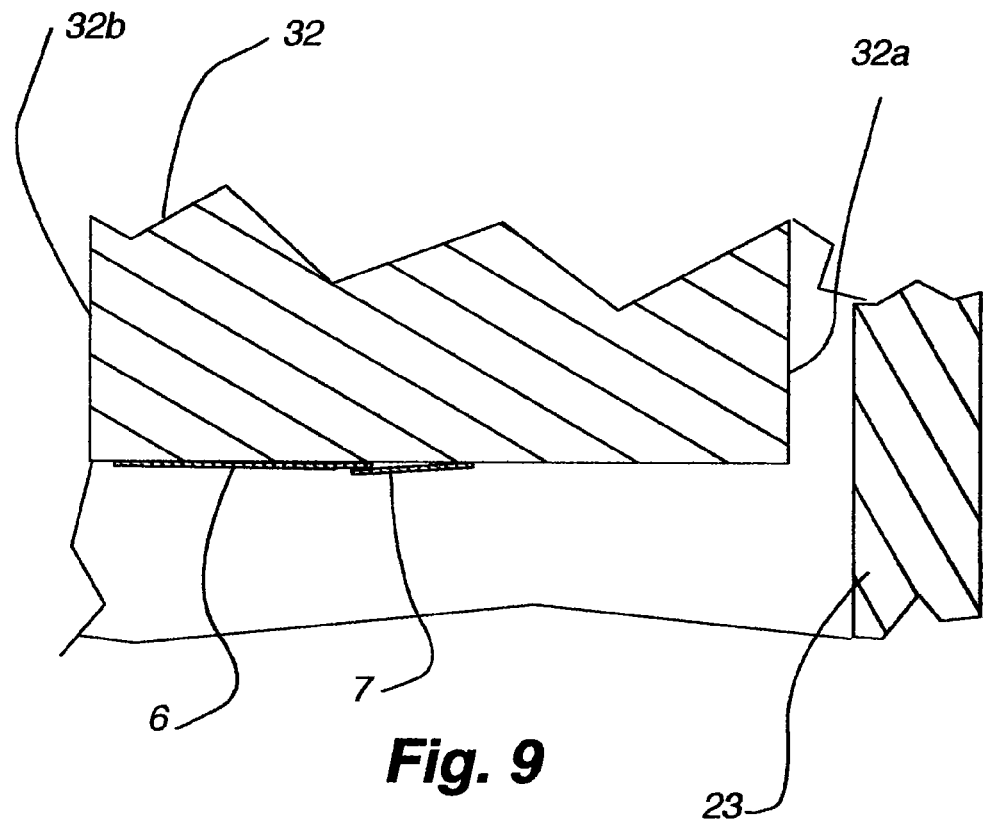
FIG. 9 is a cross-section through the outer circumferential surface of the joining roller as taken along section line 9-9 in FIG. 6 where the front vane strip first encounters the joining roller.

As shown in FIG. 6, the flip web strip 7 extends in a continuous strip from the flip web roll 28 to the main or joining roller 32. As indicated in FIGS. 7 and 9, the flip web strip 7 is laid down on the joining roller 32 in such a manner that the flip web strip 7 is centered between the back and front vane strips 5, 6. During operation of the machine 1, the flip web roller 76 freely rotates about its axis. When the machine 1 is shut down, a breaking mechanism stops the flip web roller 76 from rotating.

Figure 10:
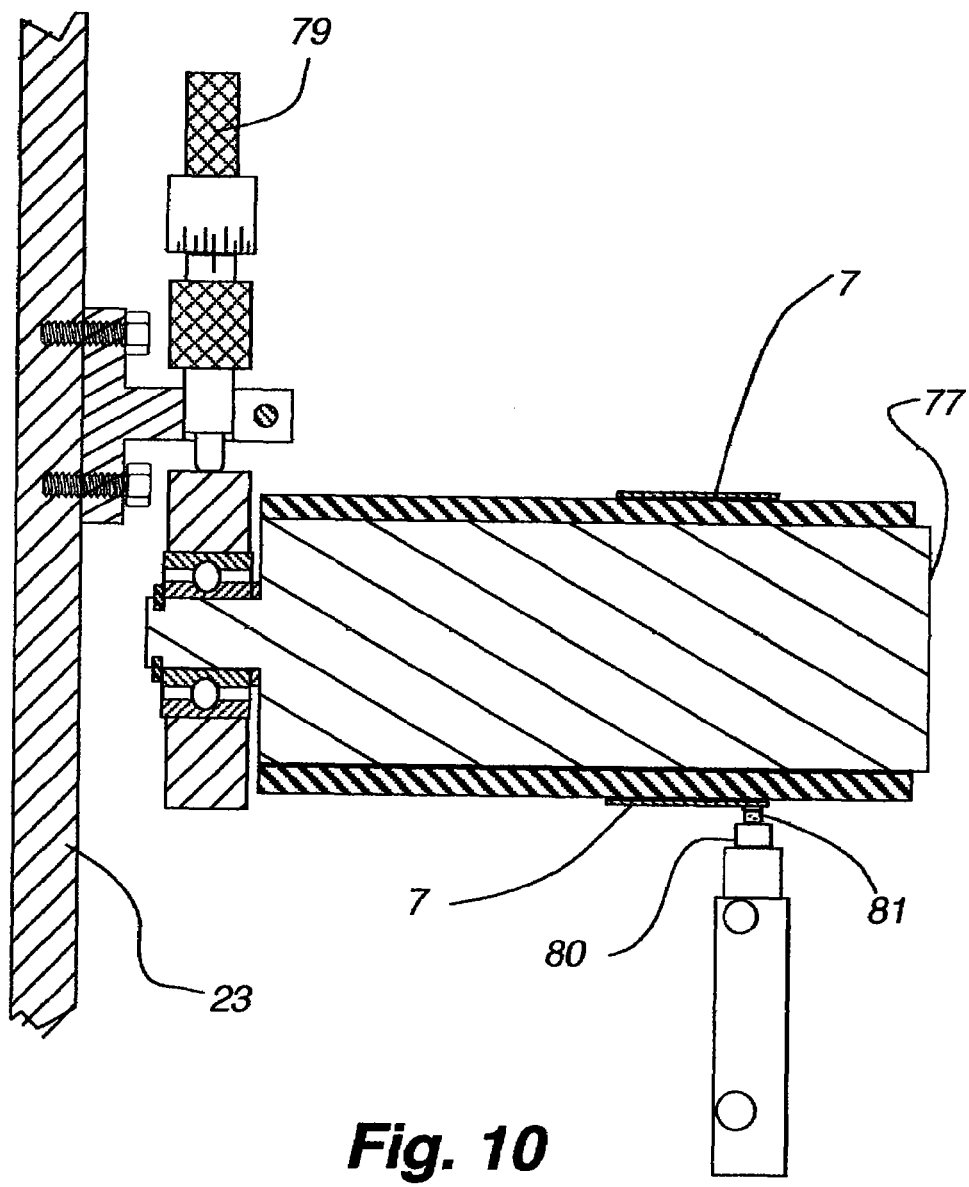
FIG. 10 is a cross-sectional elevation through the glue applicator and the mash roller as taken along section line 10-10 in FIG. 6.

As indicated in FIG. 10, which is cross-section elevation through the glue applicator 78 and the mash roller 77 as taken along section line 10-10 in FIG. 6, the glue applicator 78 includes a single glue applicator port 80, which is aligned near the front edge of the flip web strip 7. As can be understood from FIG. 10, the mash roller 77 maintains the flip web strip 7 the proper distance from the glue applicator port 80 for proper placement of the first glue bead 81. The distance between the glue applicator port 80 and the flip web strip 7 is adjusted via the adjustor 79 shown in FIG. 5. The first glue bead 81 is used to join the flip web strip 7 to the front vane strip 6, as shown in FIG. 9 and more clearly shown in FIG. 11, which is an enlarged cross-sectional view of the joined strips 6, 7 shown in FIG. 9.

The glue applicator 78 is a hot glue applicator. The glue is a hot melt glue as manufactured by Bostic-Findley and identified as H/M 71830BS.

The idler roller 71 freely rotates about its axis and serves to guide the flip web strip 7 on its path to the joining roller 32. The fixed guides 72a, 72b do not rotate and maintain the flip web strip 7 in proper lateral alignment with the joining roller 32 and the glue applicator port 80.

As shown in FIG. 5, the joining web group 45 includes an idler roller 82, a fixed guide 83, a second gluing station 84, and a joining web roll roller 86 for rotatably supporting the joining web roll 30. The second gluing station 84 includes a mash roller 87, a glue applicator 88, and an adjustor 89.

As shown in FIG. 6, the joining web strip 8 extends in a continuous strip from the joining web roll 30 to the main or joining roller 32. As indicated in FIG. 7 and more clearly indicated in FIG. 12, which is a cross-section elevation through a main nip roller 93 and the outer circumferential surface of the joining roller 32 as taken along section line 12-12 in FIG. 6 where the joining web strip 8 first encounters the joining roller 32, the joining web strip 8 is laid down on the joining roller 32 in such a manner that the joining web strip 8 is centered between, and on top of, the back and front vane strips 5, 6. During operation of the machine 1, the joining web roller 86 freely rotates about its axis. When the machine 1 is shut down, a breaking mechanism stops the joining web roller 86 from rotating.

Figure 12:
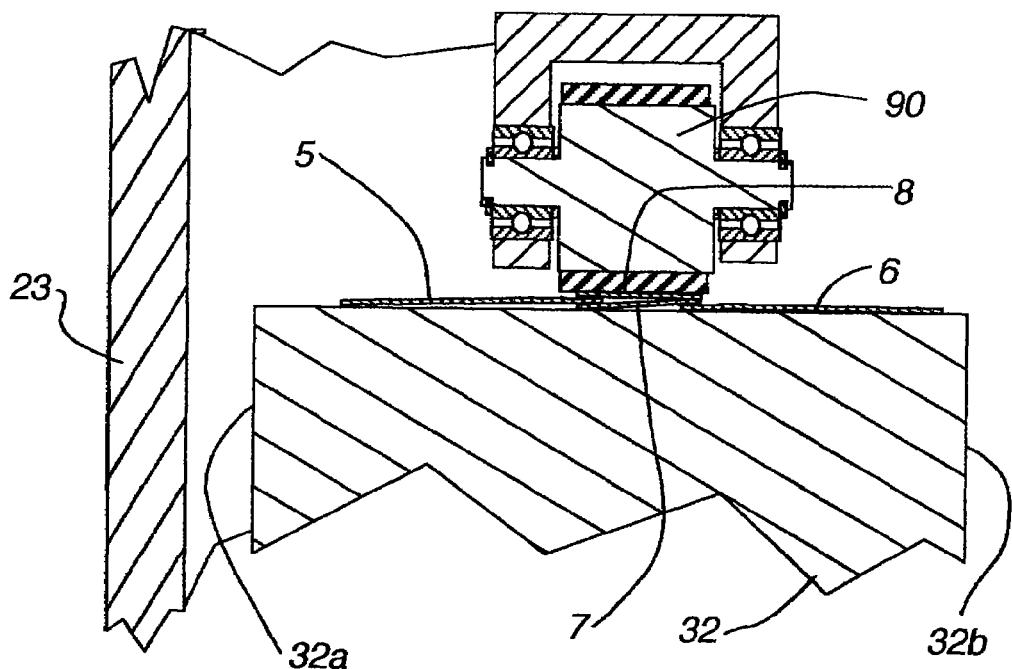
FIG. 12 is a cross-sectional elevation through the a main nip roller and the outer circumferential surface of the joining roller as taken along section line 12-12 in FIG. 6 where the joining web strip first encounters the joining roller.
Figure 13:
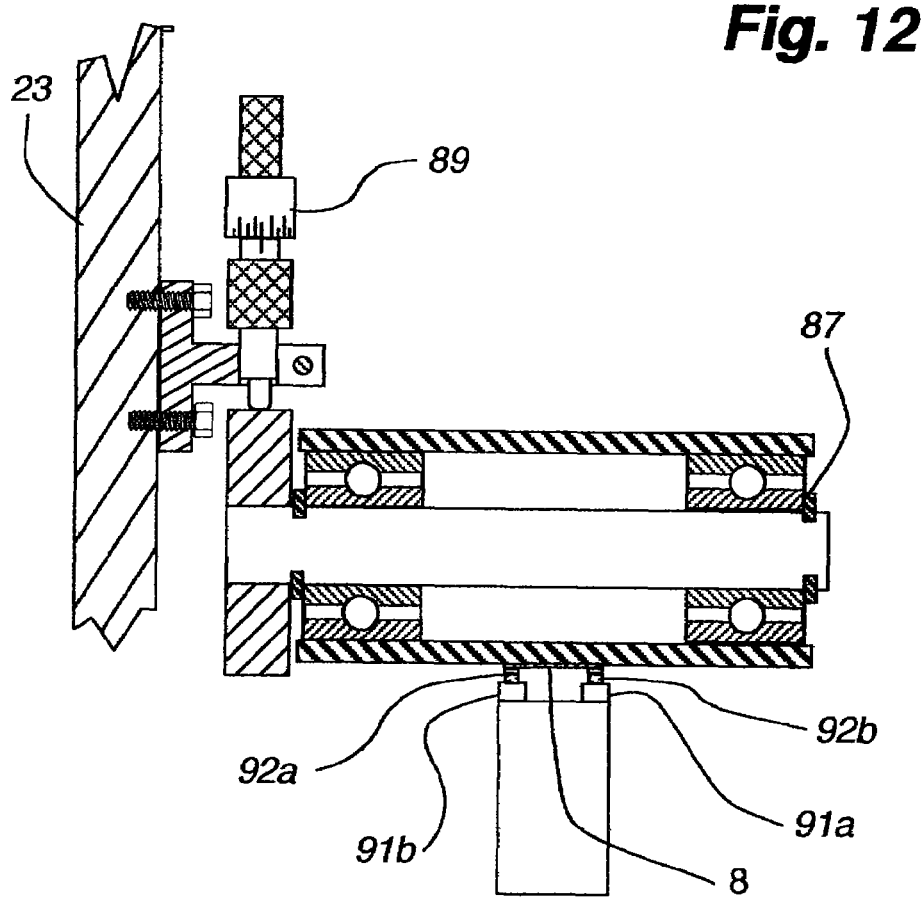
FIG. 13 is a cross-sectional elevation through the glue applicator and the mash roller as taken along section line 13-13 in FIG. 6

As indicated in FIG. 13, which is a cross-sectional elevation through the glue applicator 88 and the mash roller 87 as taken along section line 13-13 in FIG. 6, the glue applicator 88 includes one valve and two glue applicator ports 91a, 91*b*. Each glue applicator port 91*a*, 91*b* is aligned near an edge of the joining web strip 8. As can be understood from FIG. 13, the mash roller 87 maintains the joining web strip 8 the proper distance from the glue applicator ports 91*a*, 91*b* for proper placement of the second and third glue beads 92*a*, 92*b*. The distance between the glue applicator ports 91*a*, 91*b* and the joining web strip 8 is adjusted via the adjustor 89 shown in FIG. 5. The second and third glue beads 92*a*, 92*b* are used to join the joining web strip 8 to the back vane strip 5 and the flip web strip 7, as shown in FIG. 12 and more clearly shown in FIG. 14, which is an enlarged cross-sectional view of the joined strips 5, 6, 7, 8 shown in FIG. 12.

The glue applicator 88 is a hot glue applicator. The glue is a hot melt glue as manufactured by Bostic-Findley and identified as H/M 71830BS.

The idler roller 82 freely rotates about is axis and serves to guide the joining web strip 8 on its path to the joining roller 32. The fixed guide 83 does not rotate and maintains the joining web strip 8 in proper lateral alignment with the joining roller 32 and the glue applicator ports 91*a*, 91*b*.

Figure 14:
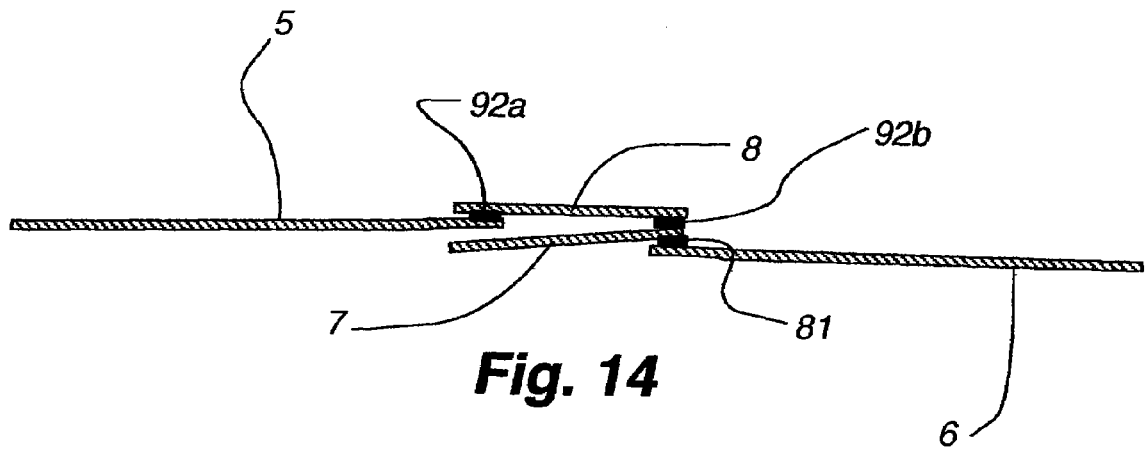
FIG. 14 is an enlarged cross-sectional view of the joined strips shown in FIG. 12.

The joining roller group 46 includes a main nip roller 93 and the main or joining roller 32. The main nip roller 93 firmly rolls against the joining roller 32 to press the fabric-type strips 5, 6, 7, 8 together, as shown in FIGS. 12 and 14. As a result, the first glue bead 81 joins together the front vane strip 6 and the flip web strip 7, and the second and third glue beads 92*a*, 92*b* join together the joining web strip 8 with the back vane strip 5 and the flip web strip 7. The joining roller 32 is powered via a dc drive coupled to an encoder for speed control. The joining roller 32 rotates clockwise as viewed in FIG. 3. The clockwise rotation of the joining roller 32 and its frictional interaction with the main nip roller 93 draws the fabric-type strips 5, 6, 7, 8 from their respective rolls 24, 26, 28, 30 to the joining roller 32. In one embodiment, the joining roller 32 is formed of aluminum, stainless steel or another metal, to serve as a heat sink to set the hot melt glue forming the first, second and third glue beads 81, 92*a*, 92*b*.

Figure 11:
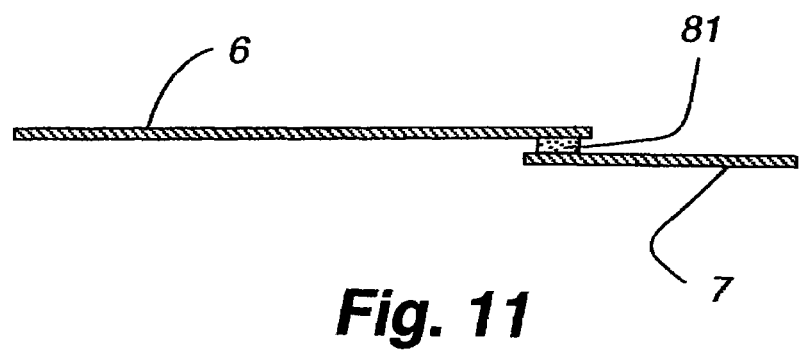
FIG. 11 is an enlarged cross-sectional view of the glue-joined flip web and front vane strips shown in FIG. 9.

As can be understood from FIGS. 6 and 7, the front vane strip 6 is the first strip to encounter the outer circumferential surface of the joining roller 32, followed by the flip web strip 7. As indicated in FIG. 9, the front vane strip 6 is laid on the outer circumferential surface of the joining roller 32 such that the front vane strip 6 extends laterally between the joining roller's front face 32*b* and the middle of its circumferential surface. The flip web strip 7 is then laid on the outer circumferential surface of the joining roller 32 such that flip web strip 7 is located approximately at the lateral middle of the joining roller's circumferential surface, and the front side edge of the flip web strip 7 extends over the back side edge of the front vane strip 6, as shown in FIG. 9. As illustrated in FIG. 11, the first glue bead 81 joins together the front vane strip 6 and the flip web strip 7 where the strips 6, 7 overlap at their respective back side and front side edges.

Figure 8:
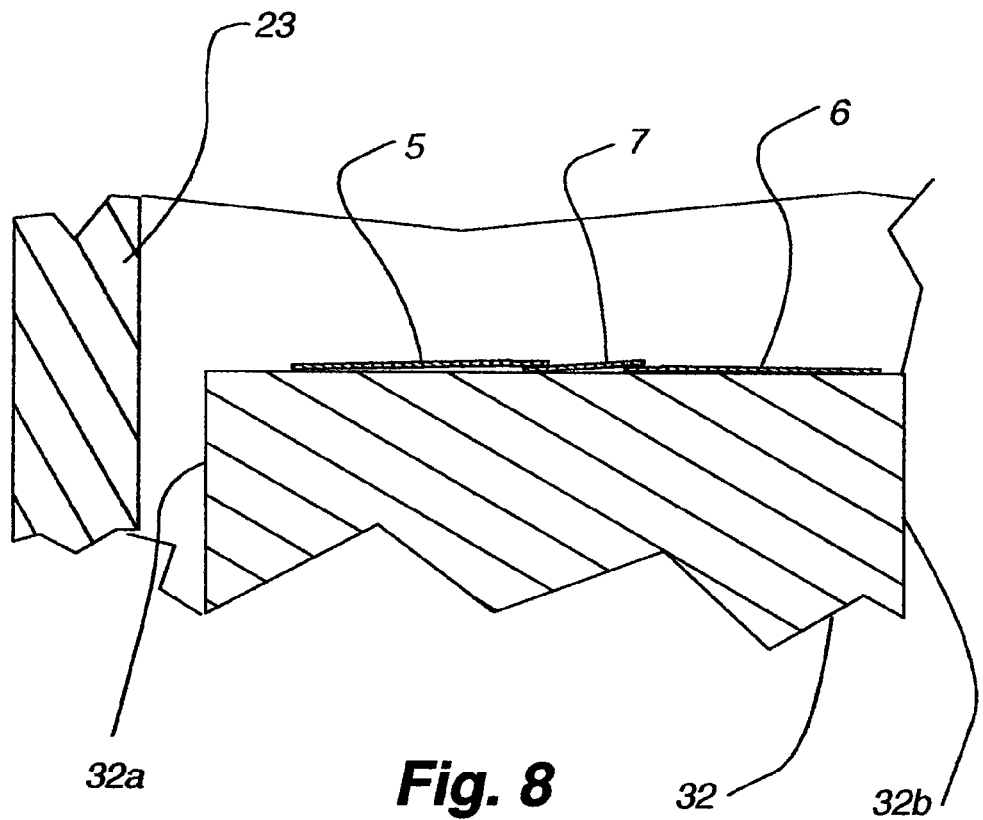
FIG. 8 is a cross-section through the outer circumferential surface of the joining roller as taken along section line 8-8 in FIG. 6 where the back vane strip first encounters the joining roller.
Figure 15:
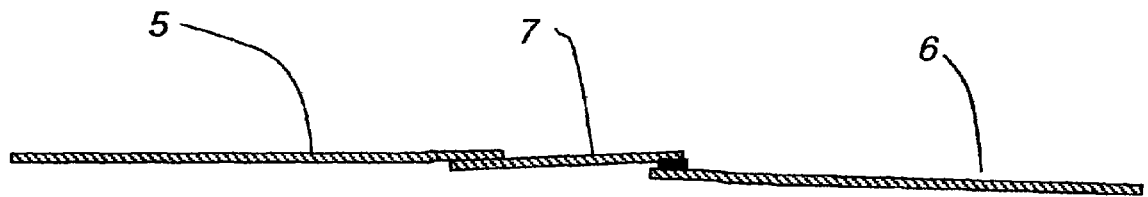
FIG. 15 is an enlarged cross-sectional view of the joined strips shown in FIG. 8.

As can be understood from FIGS. 6 and 7, the back vane strip 5 is the third strip to encounter the outer circumferential surface of the joining roller 32. As illustrated in FIG. 8, the back vane strip 5 is laid on the outer circumferential surface of the joining roller 32 such that the back vane strip 5 extends laterally between the joining roller's back face 32*a* and the middle of its circumferential surface. The front side edge of the back vane strip 5 extends over the back side edge of the flip web strip 7. As illustrated in FIG. 15, which is an enlarged cross-sectional view of the joined strips shown in FIG. 8, no glue bead exists between the back vane strip 5 and the flip web strip 7 where the strips 5, 7 overlap at their respective front side and back side edges.

As can be understood from FIGS. 6 and 7, the joining web strip 8 is the fourth and last strip to encounter the outer circumferential surface of the joining roller 32. As indicated in FIG. 12, the joining web strip 8 is laid on the outer circumferential surface of the joining roller 32 such that joining web strip 8 is located approximately at the lateral middle of the joining roller's circumferential surface (i.e., the joining web strip 8 is generally aligned with the flip web strip 7). As shown in FIG. 12, the front side edge of the joining web strip 8 extends over the front side edge of the flip web strip 7 and the back side edge of the front vane strip 6, and the back side edge of the joining web strip extends over the front side edge of the back vane strip 5 and the back side edge of the flip web strip 7. As illustrated in FIG. 14, the second glue bead 92*a* joins together the back vane strip 5 and the joining web strip 8 where the strips 5, 8 overlap at their respective front side and back side edges, and the third glue bead 92*b* joins together the flip web strip 7 and the joining web strip 8 where the strips 7, 8 overlap at their respective front side edges.

As indicated in FIGS. 5, 6, 7, 12 and 14, the fabric-type strips 5, 6, 7, 8 leave the contact point between the main nip and joining rollers 93, 32 as a single continuous fabric strip 4. The fabric strip 4 then passes from the rollers 93, 32 to the final gluing station group 47.

As shown in FIG. 5, the final gluing station group 47 includes the final gluing station 34 and a back roller 94 paired with a nip roller 95. The final gluing station 34 includes a mash roller 96, a glue applicator 98 and an adjustor 99.

As shown in FIGS. 3 and 6, the fabric strip 4 extends in a continuous strip from the joining roller 32, through the final gluing station 34, between the back roller 94 and the nip roller 95, and on to the accumulator 18. As indicated in FIG. 7 and more clearly indicated in FIG. 16, which is cross-sectional elevation through the glue applicator 98 and the mash roller 96 as taken along section line 16-16 in FIG. 6, the glue applicator 98 includes a fourth and final glue applicator port 100. The fourth glue applicator port 100 is positioned underneath the fabric strip 4 and aligned such that the port 100 is near the backside edge (i.e., the free edge) of the flip web strip 7. Thus, after passing through the final gluing station 34, the fabric strip 4 appears as shown in FIG. 17, which is a is an enlarged cross-sectional view of the fabric strip 4 shown in FIG. 16.

Figure 16:
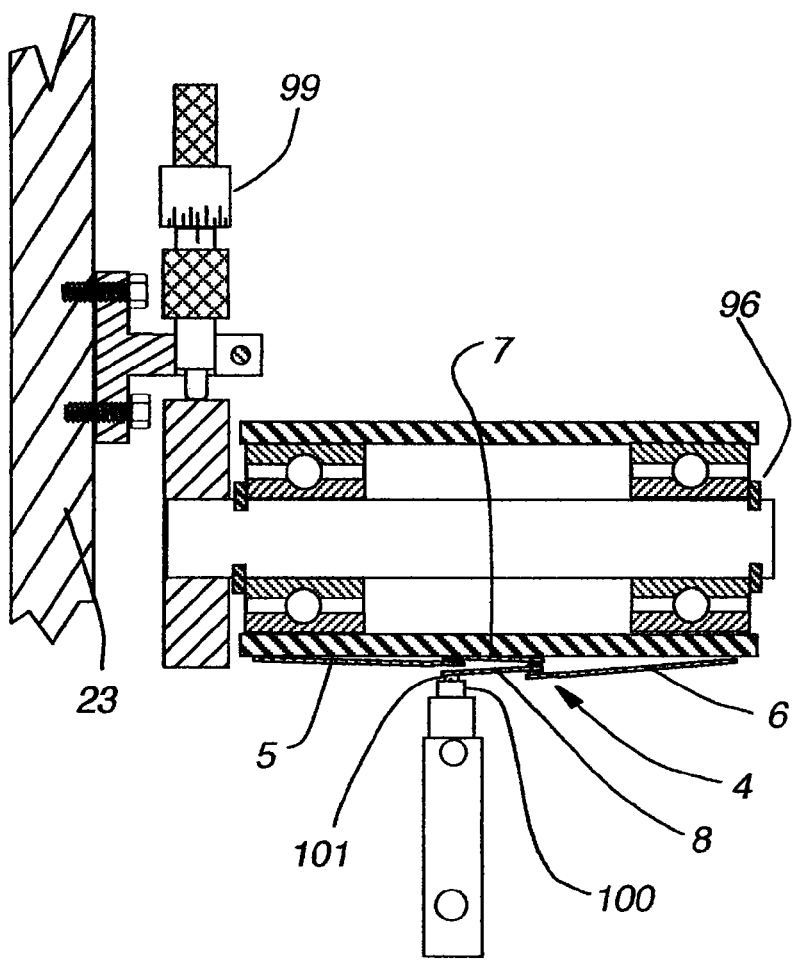
FIG. 16 is cross-sectional elevation through the final glue applicator and the mash roller as taken along section line 16-16 in FIG. 6.
Figure 17:
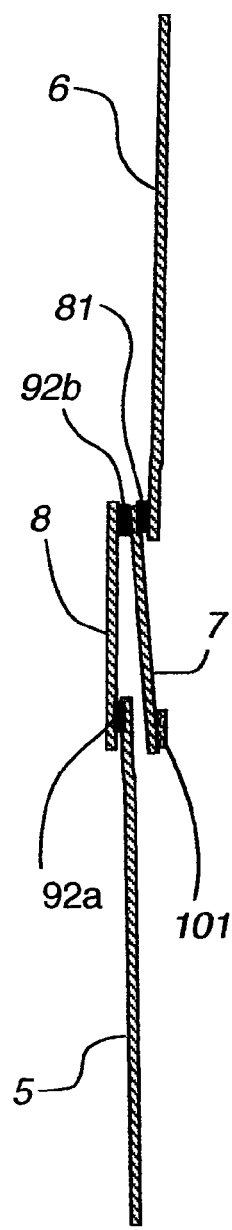
FIG. 17 is an enlarged cross-sectional view of the fabric strip shown in FIG. 16.

As can be understood from FIG. 16, the mash roller 96 maintains the fabric strip 4 the proper distance from the glue applicator port 100 for proper placement of the fourth and final glue bead 101. The distance between the glue applicator port 100 and the fabric strip 4 is adjusted via the adjustor 99 shown in FIG. 5. As discussed in the "Overview" subsection of the Detailed Description, the fourth glue bead 101 is used to join downstream fabric strips 4" to downstream fabric strips 4" already existing on the pin rack 40 in the stacker 22.

The glue applicator 98 is a model 222791 polyurethane glue applicator as manufactured by Greco Monark, Inc. The glue is a polyurethane (moisture cure) glue as manufactured by Sovereign Specialty Chemical, Inc. of 225 W. Washington Street, Suite 1450, Chicago, Ill. 60606, under the model number of the model number of QA 4865 Urethane.

Figures 18, 18A:
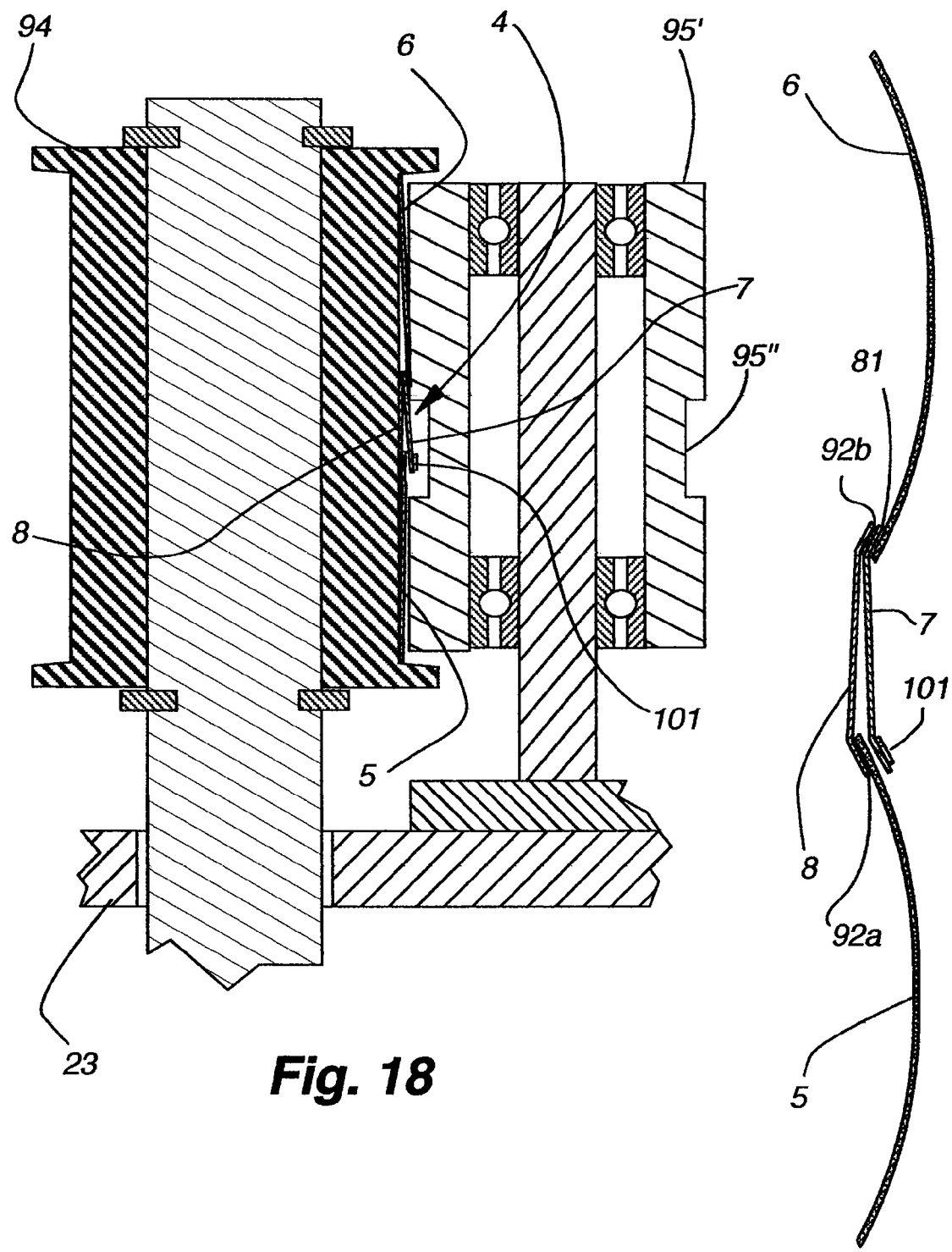
FIG. 18 is a cross-sectional elevation through the back and nip rollers as taken along section line 18-18 in FIG. 6.
FIG. 18A is an enlarged cross-sectional view of the fabric strip shown in FIG. 18.

The back roller 94 is magnetically clutched and controlled off of the speed of the joining roller 32 to maintain tension in the fabric strip 4 between the joining roller 32 and the back roller 94. The back roller 94 rolls against the nip roller 95 to draw the fabric strip 4 from the final gluing station 34 and to feed the fabric strip 4 into the accumulator 18. As illustrated in FIG. 18, which is a cross-sectional elevation through the back and nip rollers 94, 95 as taken along section line 18-18 in FIG. 6, the nip roller 95 includes a groove 95' that receives the free edge of the flip web strip 7 and the fourth glue bead 101 sitting thereon. This configuration prevents the fourth glue bead 101 from being interfered with prior to being used to attach downstream fabric strips 4" in the stacker 22.

Once the fabric strip 4 departs from between the back and nip rollers 64, 65, it will appear as indicated in FIG. 18A, which is an enlarged cross-sectional view of the fabric strip 4 shown in FIG. 18. The fabric strip 4 is now prepared to pass through the accumulator 18, the cutting station 20, and into the stacker 22 where the fabric strip 4 (in the form of a downstream fabric strip 4") will be joined via the fourth glue bead 101 to downstream fabric strips 4" comprising a fabric 2.

c. The Accumulator

Figure 19:
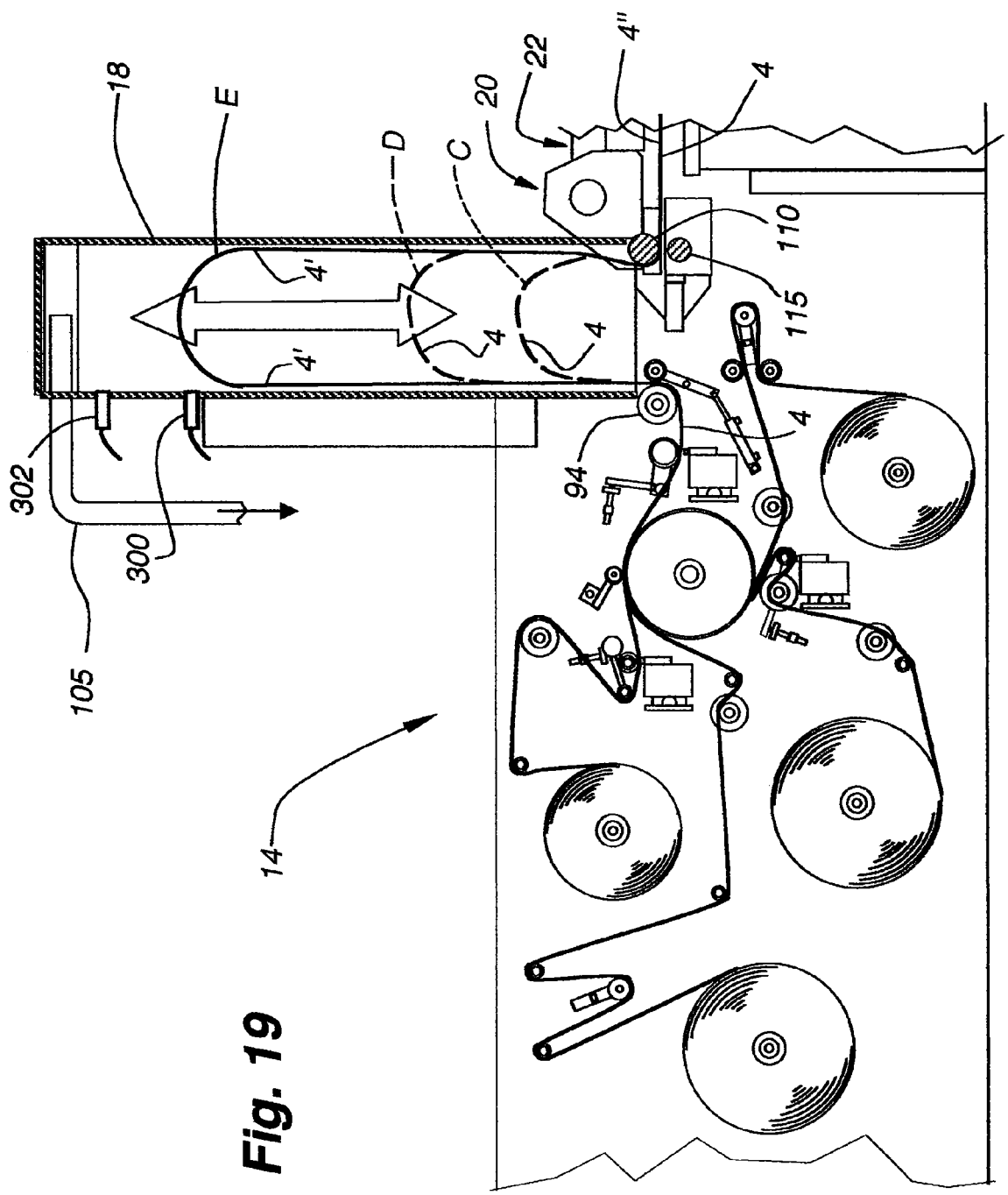
FIG. 19 is a front elevation of the joining section, the accumulator and the cutting station.

For a discussion of the accumulator 18, reference is made to FIGS. 1-3, 6 and 19. FIG. 19 is a front elevation of the joining section 14. As indicated in FIGS. 3 and 6, once the fabric strip 4 leaves the final gluing station 34, the back roller 94 feeds the fabric strip 4 into the bottom of the accumulator 18. As shown in FIGS. 1-3 and 19, the accumulator 18 is a hollow rectangular box that extends vertically. The base of the accumulator 18 generally extends from the location of the back roller 94 to the location of the cutting station 20. The distance between the interior faces of the front and back panels 18', 18" of the accumulator 18 is approximately equal to the width of the fabric strip 4. A vacuum line 105 couples to the upper end of the accumulator 18 to place the interior of the accumulator 18 in a negative pressure condition. As a result, air flows into the open bottom of the accumulator 18, up through the accumulator 18, and into the vacuum line 105.

As can be understood from FIG. 19, when the fabric strip 4 is being fed in a continuous strip directly from the joining section 14, through the accumulator 18 and cutting station 20, and out onto the vacuum belt 34 of the stacker 22, as discussed in the "Overview" subsection of the Detailed Description, the fabric strip 4 does not accumulate within the accumulator 18. Accordingly, the fabric strip 4 feeds across the accumulator following a more direct route as approximated by routes C, D or something similar.

However, when the continuous fabric strip 4 is severed at the cutting station 20 into an upstream fabric strip 4' and a downstream fabric strip 4", the severed end of the upstream fabric strip 4' is held in place at the cutting station 20 although the back roller 94 of the joining section 14 continues to feed the fabric strip 4 into the accumulator 18. The feeding of the fabric strip 4 by the back roller 94 of the joining section 14, the relatively close fit between the side edges of the fabric strip 4 and the interior faces of the front and back accumulator walls 18', 18", and the upward airflow in the accumulator 18 caused by the vacuum line 105 all combine and serve to draw the accumulating upstream fabric strip 4' upward through the accumulator 18, as depicted by route E in FIG. 19.

As depicted in FIG. 19, the accumulator 18 includes a lower electric eye 300 and an upper electric eye 302. When the upstream fabric strip 4' has accumulated to the point, as indicated by route E in FIG. 19, that the fabric strip 4' passes in front of the lower electric eye 300, the fabric transportation mechanisms (i.e., rollers and vacuum belt) in the cutting station 20 and stacker 22 are triggered such that the severed end of the upstream fabric strip 4' is released and the cutting station 20 again feeds the fabric strip 4 in a continuous strip from the joining section 14, through the accumulator 18 and the cutting station 20, and out onto the vacuum belt 34 of the stacker 22. As a result, the fabric strip 4 will again feed across the accumulator 18 following the more direct routes C, D or something similar.

In the event that the upstream fabric strip 4' accumulates in the accumulator 18 such that the upstream fabric strip 4' passes in front of the upper electric eye 302, the machine 1 is triggered to shut down. In one embodiment, over accumulation of the upstream fabric strip 4' in the accumulator 18 results in the joining section 14 shutting down.

d. The Cutting Station

Figure 21:
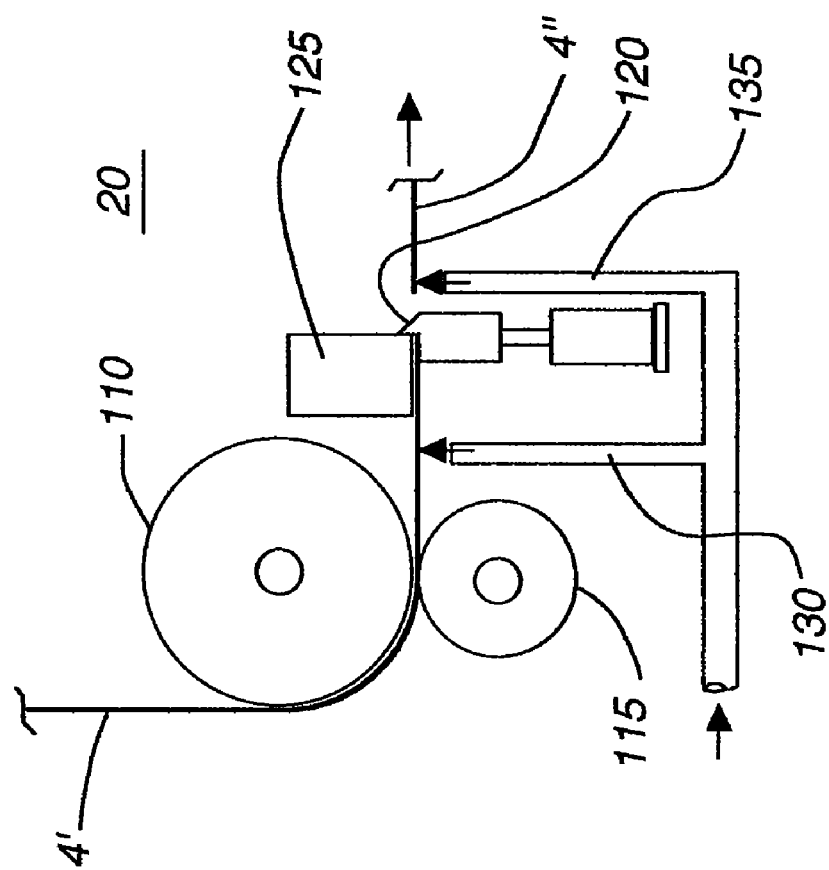
FIG. 21 is the same view depicted in FIG. 20, except the cutting station is actuated to cut the fabric strip into upstream and downstream fabric strips.
Figure 20:
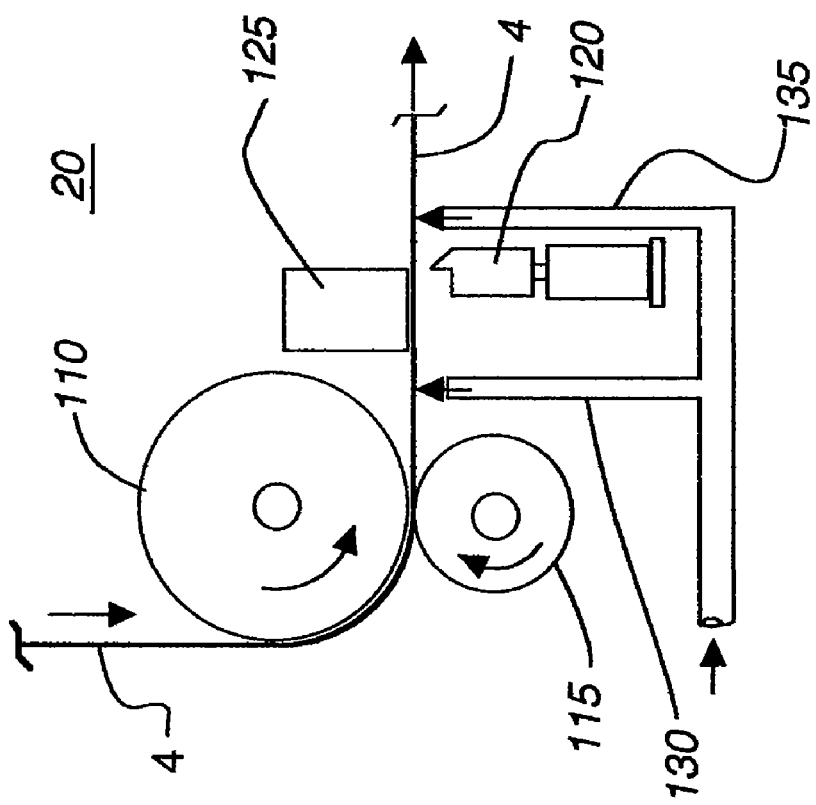
FIG. 20 is an enlarged schematic front elevation of the cutting station depicted in FIG. 19, wherein the cutting station has not cut the fabric strip.

For a discussion of the cutting station 20, reference is made to FIGS. 3 and 19-21. FIG. 20 is an enlarged schematic front elevation of the cutting station depicted in FIG. 19, wherein the cutting station 20 has not cut the fabric strip 4. FIG. 21 is the same view depicted in FIG. 20, except the cutting station 20 is actuated to cut the fabric strip 4 into upstream and downstream fabric strips 4', 4". As indicated in FIGS. 19-21, the cutting station 20 includes a back roller 110 paired with a pair of coaxial nip rollers 115, a pneumatically driven knife 120 paired with a knife block 125, a first set of air jet nozzles 130, and a second set of air jet nozzles 135. The back roller 110 is air clutched with the servomotor 36 driving the vacuum belt 34 of the stacker 22 (see FIGS. 1-3).

The back roller 110 rolls against the pair of independent coaxial nip rollers 115 to feed the fabric strip 4 from the accumulator 18, through the cutting station 20, and onto the vacuum belt 34. The pair of coaxial nip rollers 115 are axially spaced apart from each other. This arrangement forms a gap between the rollers 115 that acts similarly to the groove 95' in the nip roller 95 depicted in FIG. 18 to prevent interference with the final glue bead 101 prior to its being used to attach downstream fabric strips 4" in the stacker 22.

As indicated in FIGS. 3, 19 and 20, when the fabric strip 4 is being fed in a continuous strip from the accumulator 18 out onto the vacuum belt 34, the clutch for the back roller 110 is engaged to cause the back roller 110 to operate in conjunction with the servomotor 36. Specifically, when the clutch is engaged, the back roller 110 rotates counterclockwise and the nip roller 115 rotates clockwise, as shown in FIG. 20. Air streams from the air jet nozzles 130, 135 blow against the bottom surface of the fabric strip 4 to maintain the fabric strip 4 against the bottom surface of the knife block 125.

As shown in FIG. 21, the clutch disengages such that the back roller 110 and the nip roller 115 cease to rotate. This occurs when the fabric strip 4 reaches point B on the stacker 22, as shown in FIGS. 1-3 and discussed in the "Overview" section of the Detailed Description. The knife 120 is then pneumatically actuated towards the fabric strip 4, which is held against the bottom surface of the knife block 125 via the air streams exiting the air jet nozzles 130, 135. The knife 120 severs the fabric strip 4 into an upstream fabric strip 4' and a downstream fabric strip 4". The knife 120 then returns to its non-actuated position shown in FIG. 20. As shown in FIG. 21, while the back and nip rollers 110, 115 remain stopped, the downstream fabric strip 4" is pulled away from the cutting station 20 via the vacuum belt 34 of the stacker 22, as discussed in the "Overview" section of the Detailed Description. Once another fabric strip 4 is needed for the stacker 22, the clutch engages such that the back and nip rollers 110, 115 again feed the fabric strip 4 through the cutting station 20, as discussed above and shown in FIG. 20.

e. The Stacker

Figure 22:
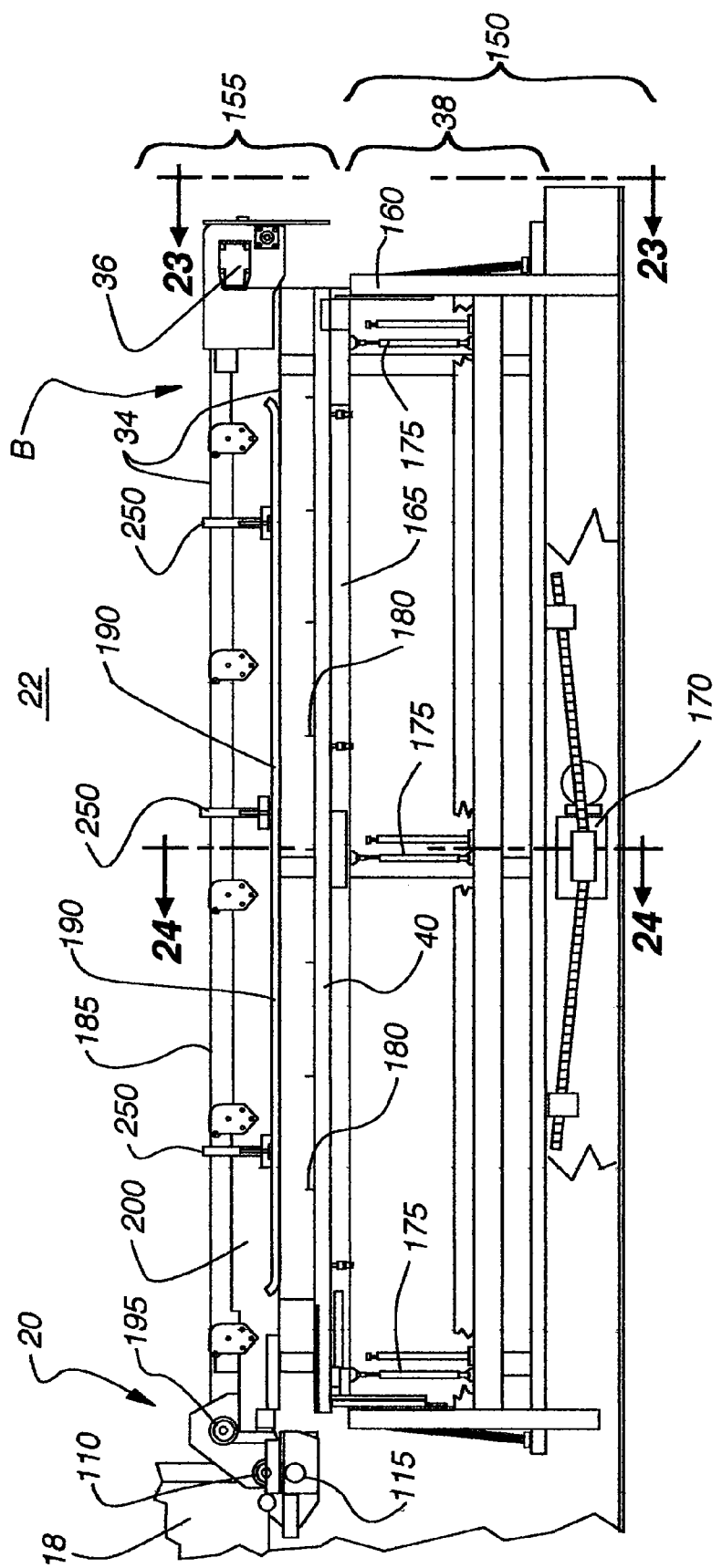
FIG. 22 is a front elevation of the stacker.
Figure 23:
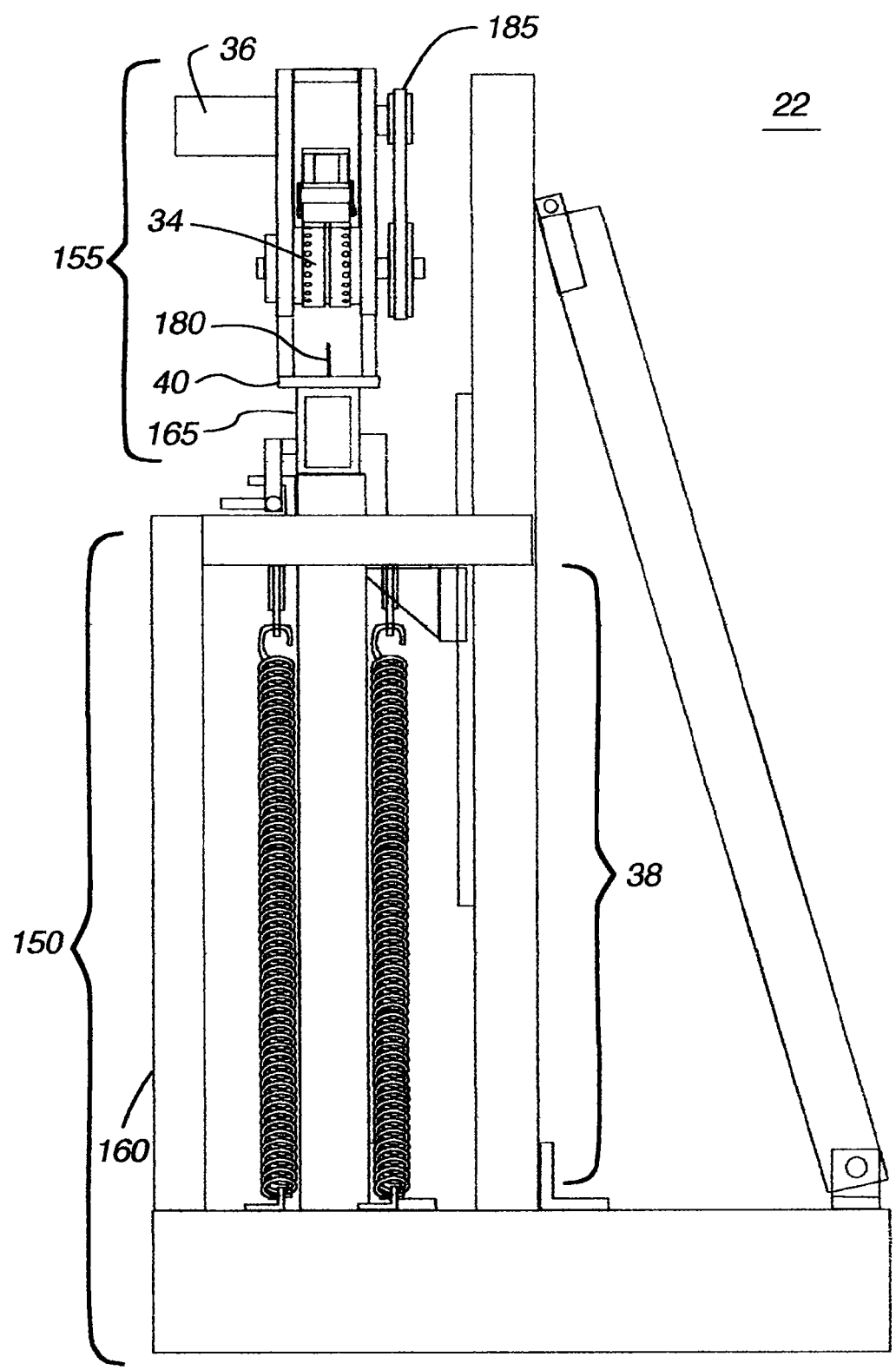
FIG. 23 is an end elevation of the stacker as viewed along line 23-23 in FIG. 22.
Figure 24:
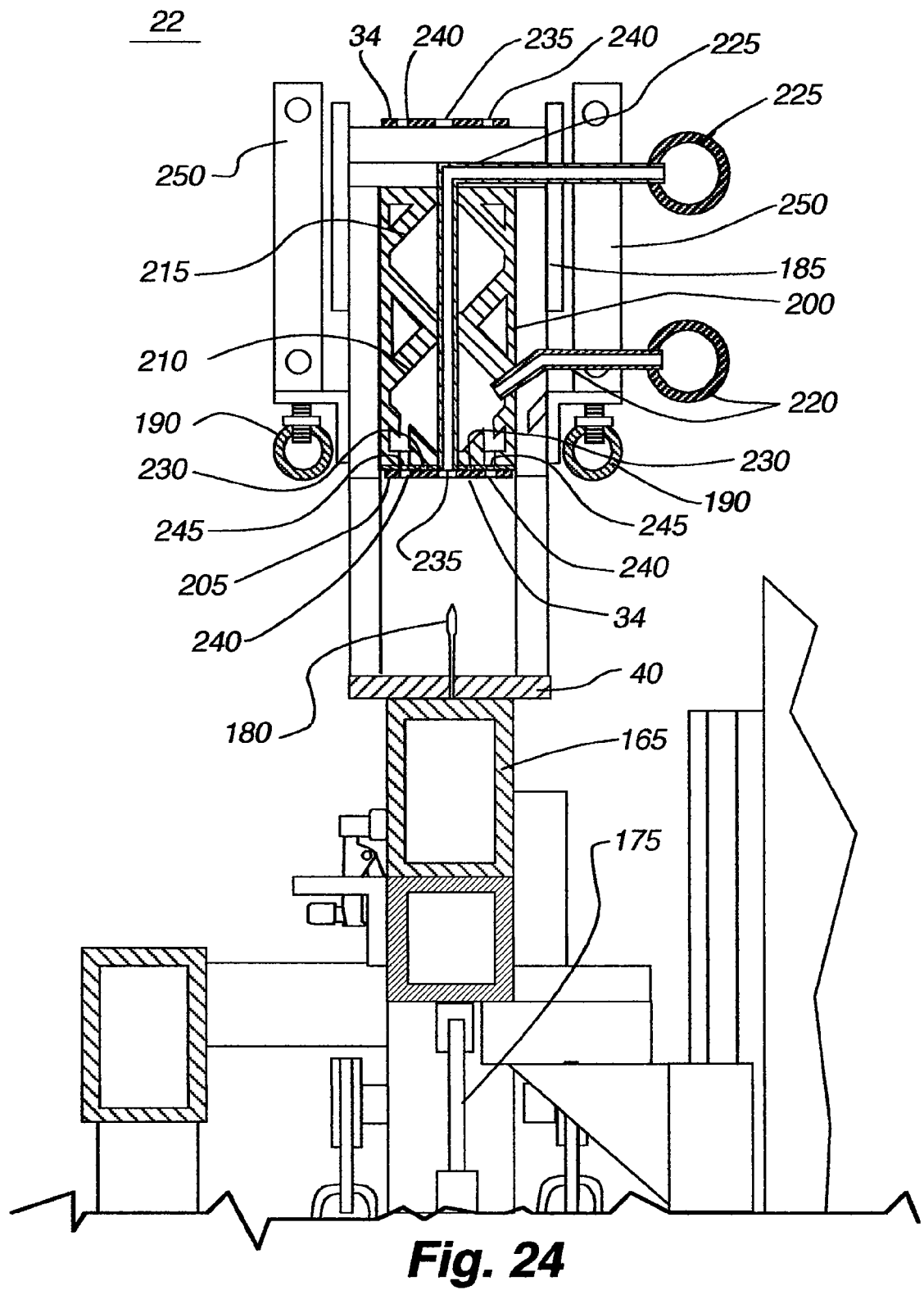
FIG. 24 is a cross-sectional elevation of the stacker as taken along section line 24-24 in FIG. 22.

For a discussion of the stacker 22 and its components, reference is made to FIGS. 22-24. FIG. 22 is a front elevation of the stacker 22. FIG. 23 is an end elevation of the stacker 22 as viewed along line 23-23 in FIG. 22. FIG. 24 is a cross-sectional elevation of the stacker 22 as taken along section line 24-24 in FIG. 22.

As shown in FIGS. 22-24, the stacker 22 includes a lower portion 150 and an upper portion 155 supported by the lower portion 150. The lower portion 150 includes a lower framework 160 and an elevator 38 supported by, and vertically displaceable within, the lower framework 160. The elevator 38 includes a platform 165, an elevator power source 170 and a series of vertical displacers (e.g., hydraulic or pneumatic rams, screw jacks, etc.) 175 for vertically displacing the platform 165. The pin rack 40 is supported by the platform 165. The pin rack 40 includes a series of pins 180 for impaling downstream fabric strips 4" delivered by vacuum belt 34.

The upper portion 150 includes an upper framework 185, the vacuum belt 34, disengaging bars 190, a vacuum belt roller 195, and the servomotor 36 for powering the vacuum belt 34. As indicated in FIG. 24, the upper framework 185 includes a vacuum head rail 200 and a nylon rail face 205 against which the vacuum belt 34 displaces. The vacuum head rail 200 includes a vacuum chamber 210 extending the length of the rail 200 and a series of pressure tubes 215 evenly distributed along the length of the rail 200 and positioned to receive therein a corresponding pin 180 on the pin rack 40. The vacuum chamber 210 is in communication with a vacuum line 220 to maintain the vacuum chamber 210 in a negative pressure condition. Each pressure tube 215 is coupled to a source of pressurized air via a pressure line 225.

The rail face 205 includes two grooves 230 that are in communication with the vacuum chamber 210, are located towards the middle of the rail face 205, and extend longitudinally along the rail face 205. These grooves 230 maintain the vacuum belt 34 against the rail face 205. The vacuum belt 34 includes a center continuously extending slot 235 and two lines 240 of evenly distributed holes, which are located along the outer edge of the vacuum belt 34. The center slot 235 receives the pins 180 when the elevator platform 165 is in the most upward position to cause the pins 180 to impale a new downstream fabric strip 4" just delivered by the vacuum belt 34. The rail face 205 also includes two grooves 245 that are in communication with the vacuum chamber 210, are aligned with the lines 240 of holes in the vacuum belt 34, and extend longitudinally along the rail face 205. The holes 240 and grooves 245 cooperate to hold the fabric strip 4 against the vacuum belt 34.

Each disengaging bar 190 is supported off a series of actuators 250 (e.g., pneumatic operators) that extend the bar 190 downward to push a fabric strip 4 from the vacuum belt 34. Each actuator 250 is mounted to the upper framework 185.

Figure 25:
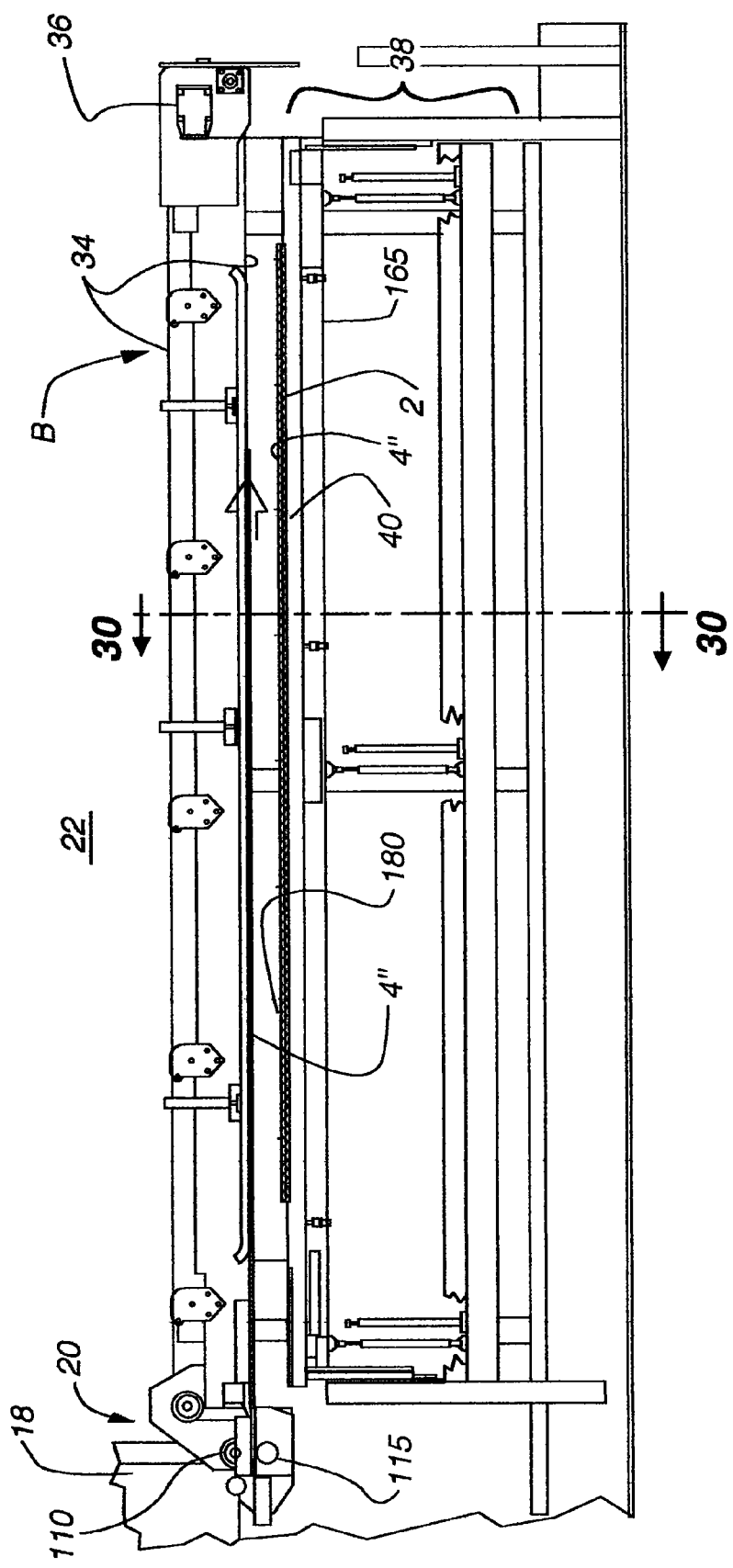
FIG. 25 is a front elevation of the stacker wherein a downstream fabric strip is being fed along the vacuum belt from the cutting station.
Figure 26:
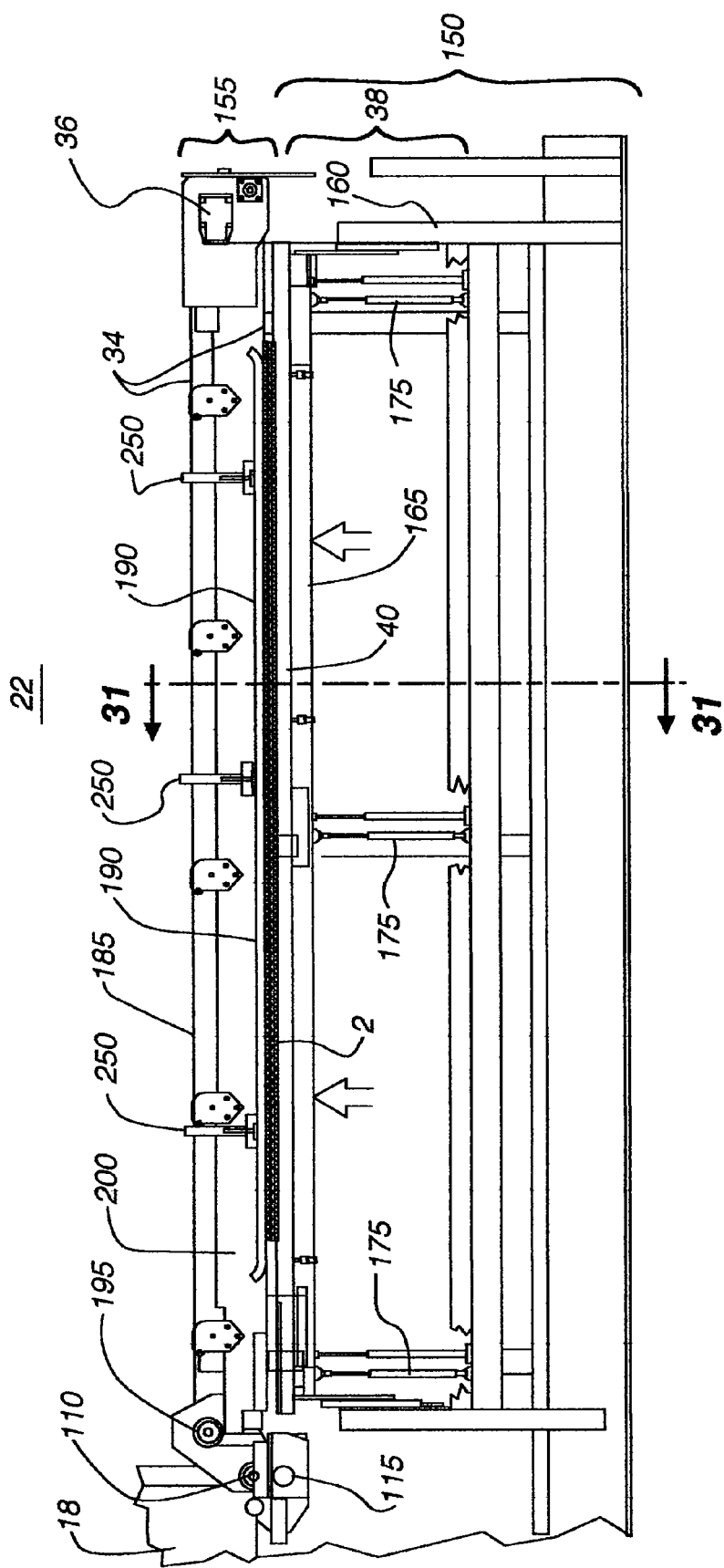
FIG. 26 is the same view depicted in FIG. 25, except the elevator has raised the pin rack up to impale the downstream fabric strip held by the vacuum belt.
Figure 27:
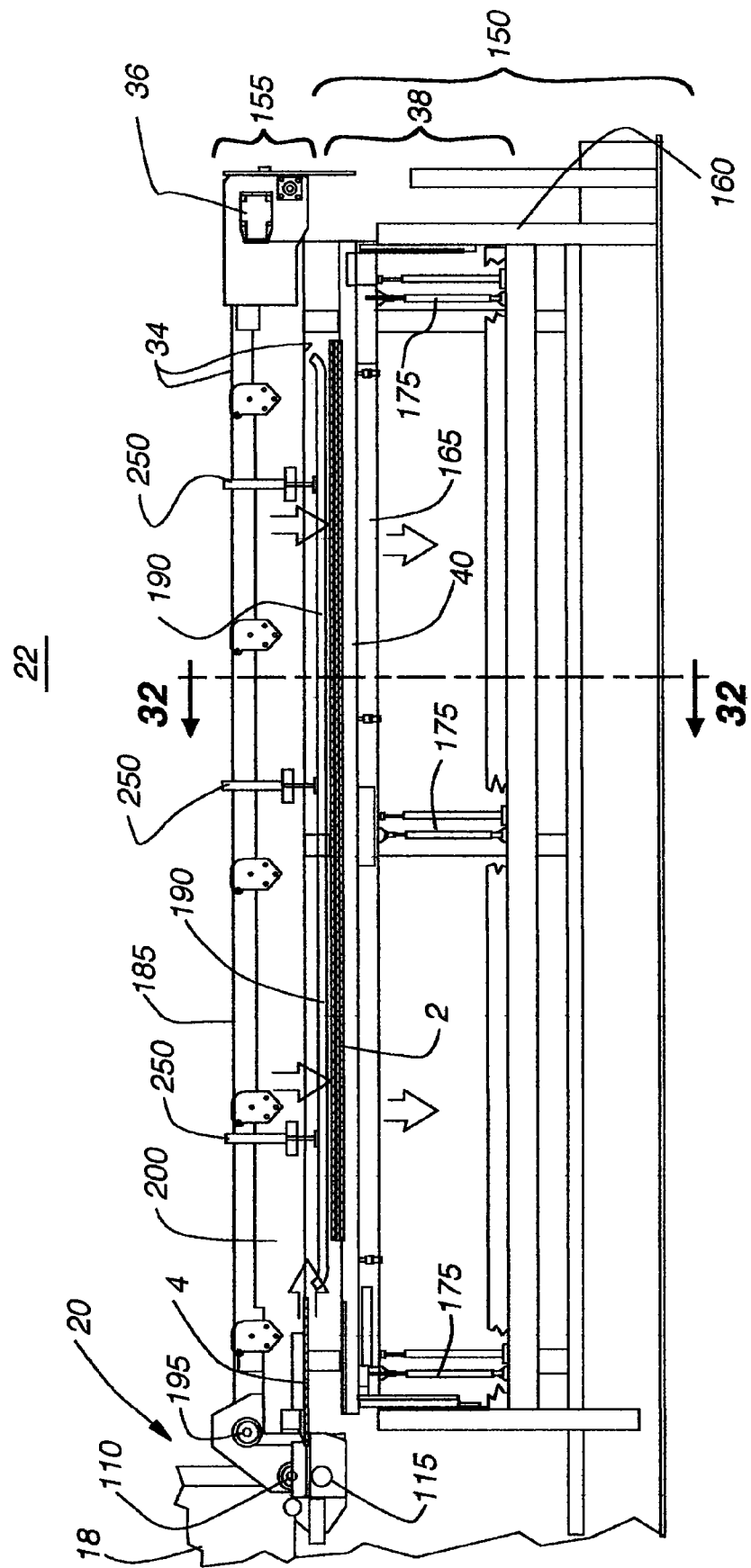
FIG. 27 is same view depicted in FIG. 25, except the elevator has descended and the disengaging bars have extended downward to help remove the downstream fabric strip from the vacuum belt.
Figure 28:
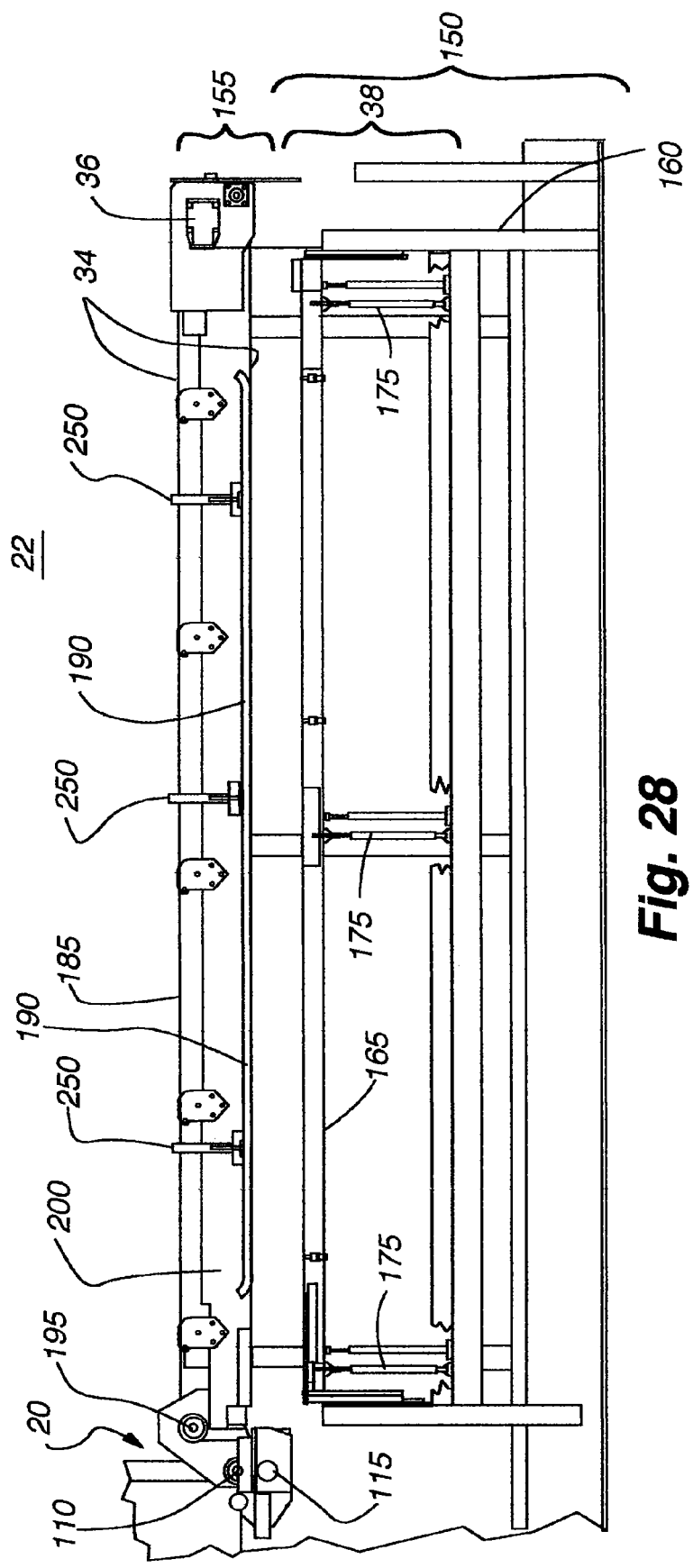
FIG. 28 is the same view depicted in FIG. 25, except the pin rack has been removed from the stacker.
Figure 29:
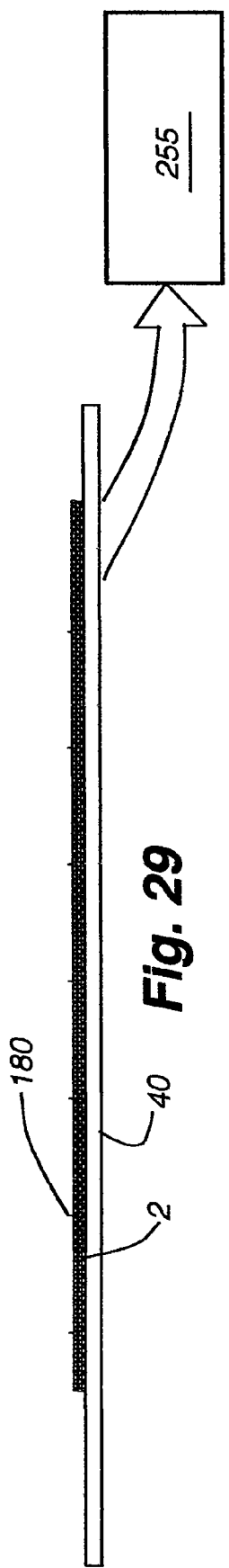
FIG. 29 is a side elevation view of the pin rack with the fabric impaled thereon being prepared for placement within a humidity chamber.
Figure 30:
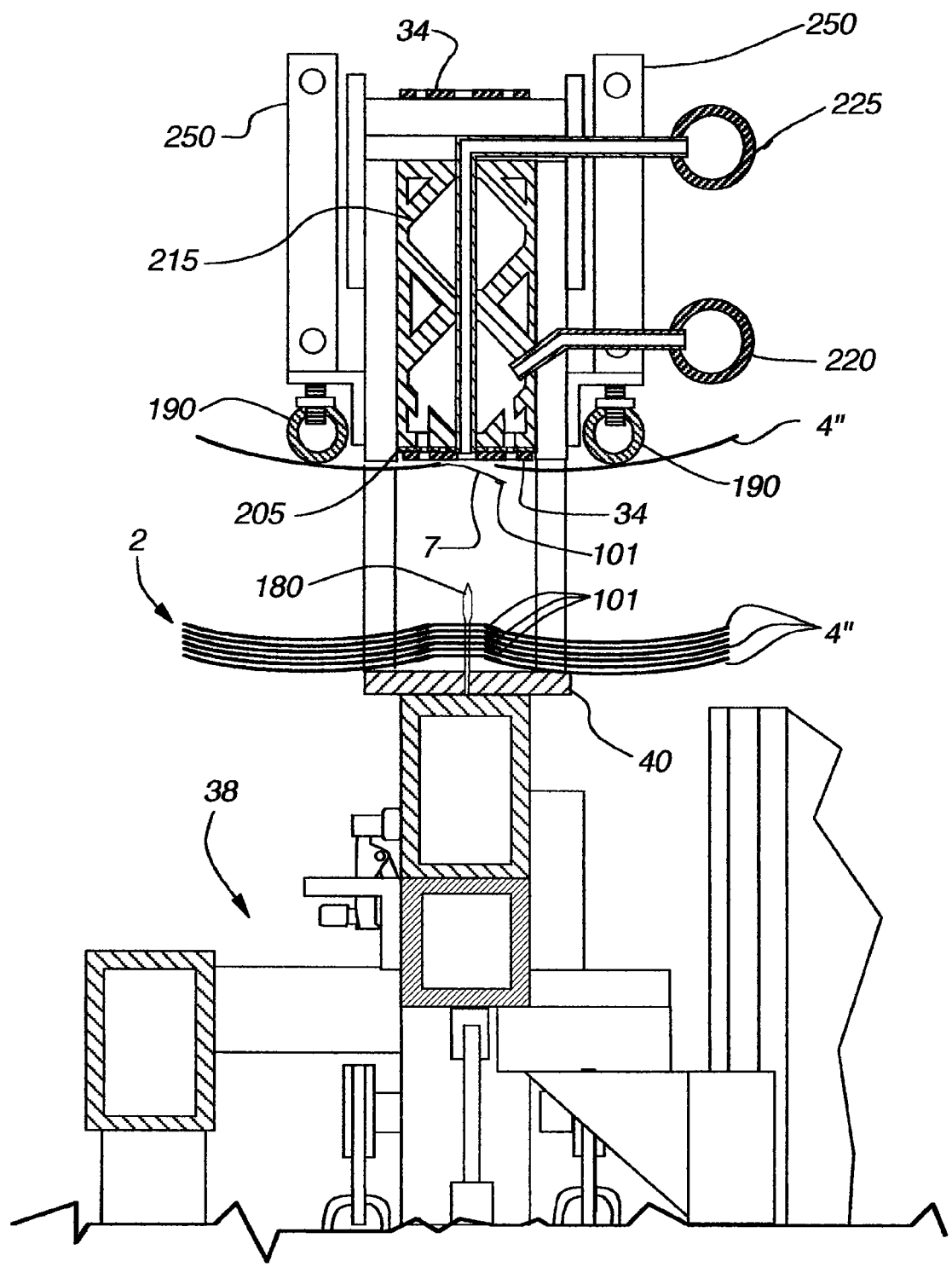
FIG. 30 is a cross-sectional elevation of the stacker taken along section line 30-30 in FIG. 25.
Figure 31:
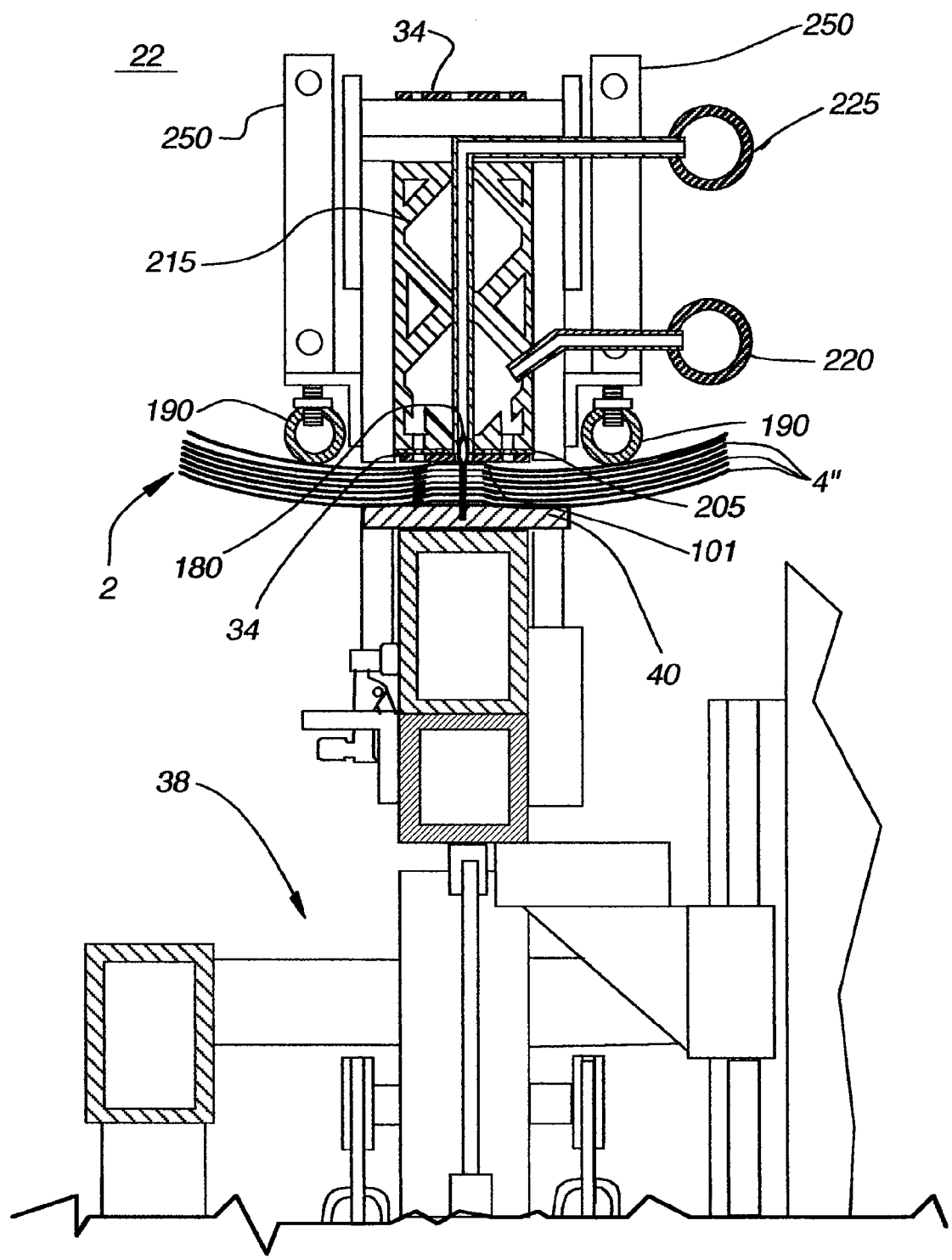
FIG. 31 is a cross-sectional elevation of the stacker taken along section line 31-31 in FIG. 26.
Figure 32:
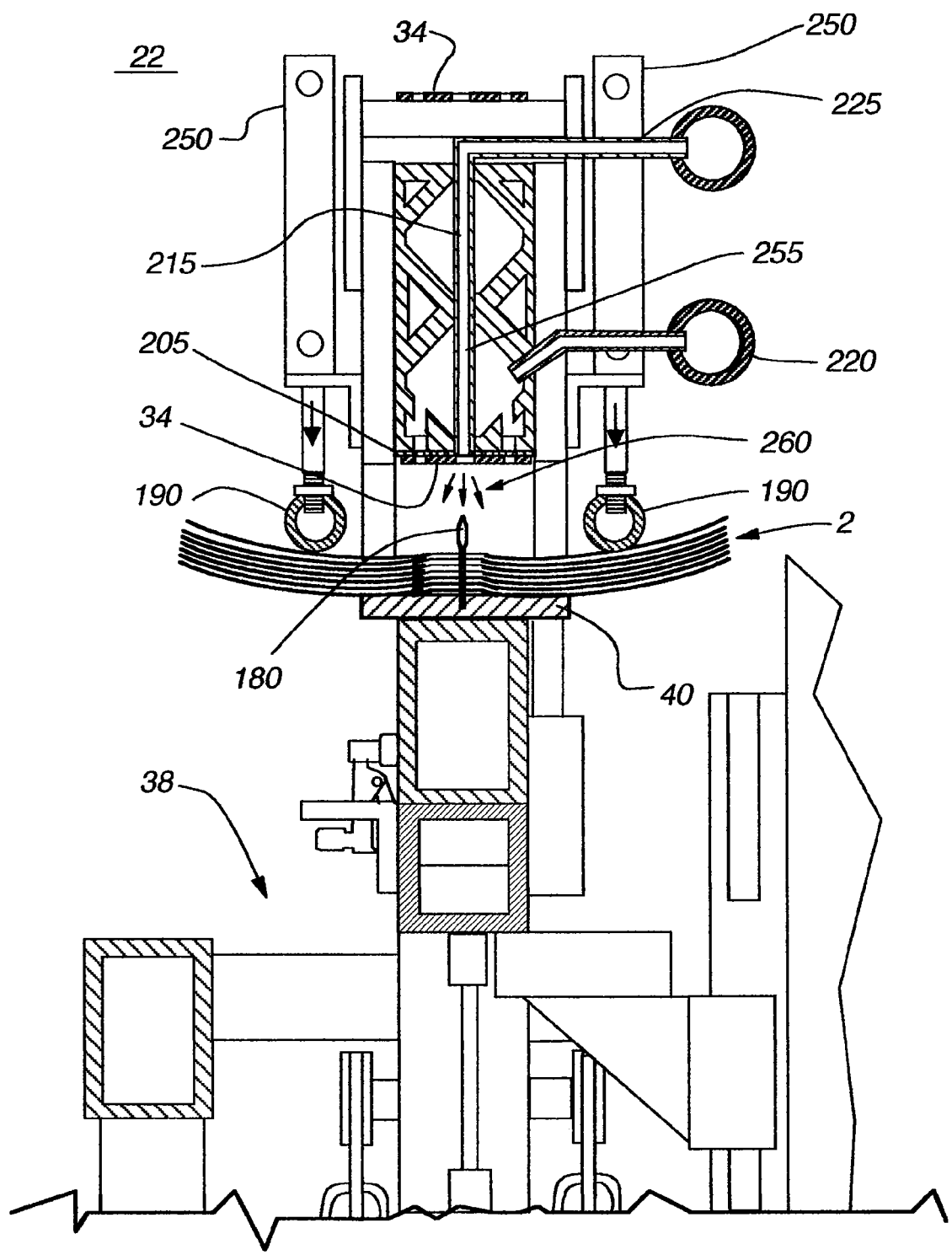
FIG. 32 is a cross-sectional elevation of the stacker taken along section line 32-32 in FIG. 27.

For a discussion regarding the operation of the stacker, reference is made to FIGS. 25-32. FIG. 25 is a front elevation of the stacker 22 wherein a downstream fabric strip 4" is being fed along the vacuum belt 34 from the cutting station 20. FIG. 26 is the same view depicted in FIG. 25, except the elevator 38 has raised the pin rack 40 up to impale the downstream fabric strip 4" held by the vacuum belt 34. FIG. 27 is same view depicted in FIG. 25, except the elevator 38 has descended and the disengaging bars 190 have extended downward to help remove the downstream fabric strip 4" from the vacuum belt 34. FIG. 28 is the same view depicted in FIG. 25, except the pin rack 40 has been removed from the stacker 22. FIG. 29 is a side elevation view of the pin rack 40 with the fabric 2 impaled thereon being prepared for placement within a humidity chamber 255. FIG. 30 is a cross-sectional elevation of the stacker 22 taken along section line 30-30 in FIG. 25. FIG. 31 is a cross-sectional elevation of the stacker 22 taken along section line 31-31 in FIG. 26. FIG. 32 is a cross-sectional elevation of the stacker 22 taken along section line 32-32 in FIG. 27.

As can be understood from FIG. 3 and as discussed in the preceding subsections of the Detailed Description, a continuous fabric strip 4 is fed from the joining section 14, through the accumulator 18 and the cutting station 20, and out onto the vacuum belt 34 of the stacker 22 until the end of the fabric strip 4 reaches point B, as depicted in FIG. 25. The vacuum belt 34 and the rollers 110, 115 of the cutting station 20 stop moving while the cutting station 20 cuts the fabric strip 4 into an upstream fabric strip 4' and a downstream fabric strip 4".

As indicated in FIG. 25, the servomotor 36 resumes operation such that the vacuum belt 34 resumes movement and transports the downstream fabric strip 4" to the end of the stacker 22. However, during this movement of the vacuum belt 34, the clutch for the back roller 110 remains disengaged such that the upstream fabric strip 4' does not advance into the stacker 22. The downstream fabric strip 4" is positioned along the upper portion 155 via the vacuum belt 34 such that the downstream fabric strip 4" is vertically aligned with downstream fabric strips 4" previously fed into the stacker and impaled on the pin rack 40. As shown in FIG. 30, the downstream fabric strip 4" is suspended by the vacuum belt 34, which displaces along the rail face 205, and the previously provided downstream fabric strips 4" are impaled by the pins 180 of the pin rack 40 and joined together via their respective fourth glue beads 101 to form a fabric 2.

As shown in FIGS. 26 and 31, once the downstream fabric strip 4" is properly aligned with those downstream fabric strips 4" already impaled on the pin rack 40, the elevator 38 will raise the platform 165 with the pin rack 40 mounted thereon. The fourth glue bead 101 of the downstream fabric strip 4" suspended by the vacuum belt 34 bounds the free end of the flip web strip 7 (see FIG. 30) to the top surface of the top downstream fabric strip 4" held on the pin rack 40. As indicated in FIGS. 26 and 31, each pin 180 passes through the center slot 235 of the vacuum belt 34 and into a pressure tube 215.

As illustrated in FIGS. 27 and 32, once the new downstream fabric strip 4" is bonded to the rest of the downstream fabric strips 4" forming the fabric 2 impaled on the pin rack 40, the elevator 38 descends away from the upper portion 155 of the stacker 22. At the same time, the disengaging bars 190 are extended downward to push the downstream fabric strip 4" from the vacuum belt 34. Also, at the same time, a blast 260 of pressurized air is sent down each pressure tube 215 to facilitate disengagement of the downstream fabric strip 4" from the vacuum belt 34.

Once the elevator 38 has fully descended with the pin rack 40 and the fabric 2 impaled thereon, the disengaging bars 190 retract upwards to the position indicated in FIG. 30. At this time, another continuous fabric strip 4 is fed from the accumulator 18, through the cutting station 20, and onto the vacuum belt 34 of the stacker 22, as can be understood from FIGS. 25 and 27. The aforementioned process then repeats itself to add another downstream fabric strip 4" to the fabric 2 impaled on the pin rack 40.

Once a sufficient number of downstream fabric strips 4" have been impaled on the pin rack 40 to form an adequately sized fabric 2, the pin rack 40 with the fabric 2 impaled thereon is removed from the platform 165 of elevator 38 and placed as a whole into a humidity chamber 255 to cure the glue utilized in the fourth glue beads 101, as indicated in FIGS. 28 and 29. The humidity chamber is maintained at approximately 80° F. and 80-90% relative humidity. The pin rack 40 and fabric 2 impaled thereon are held in the humidity chamber 255 under these conditions for approximately one hour. Once, the glue is properly cured, the pin rack 40 and fabric 2 impaled thereon are removed from the humidity chamber 255. After approximately 24 hours, the fabric 2 is removed from the pin rack 40. The fabric 2 is then ready for attachment to a head rail mechanism 41 to create a covering 3 for an architectural opening as depicted in FIG. 4a.

Figure 33:
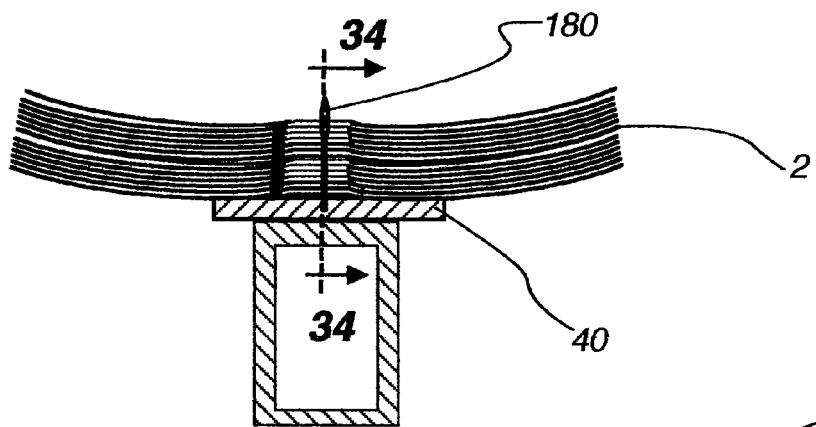
FIG. 33 is an enlarged cross-sectional elevation of the pin rack and fabric impaled thereon.
Figure 34:
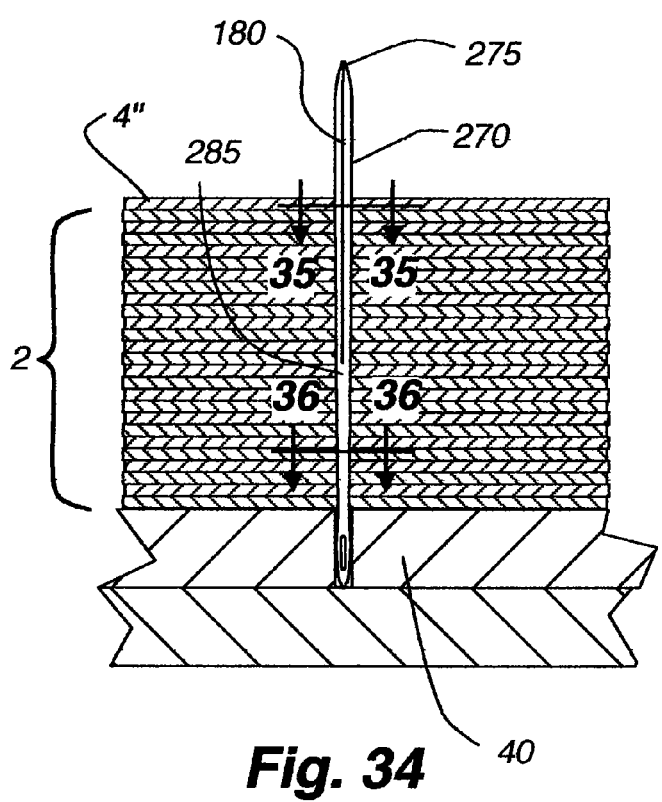
FIG. 34 is an enlarged cross-sectional elevation of a pin as taken along section line 34-34 in FIG. 33.
Figure 35:
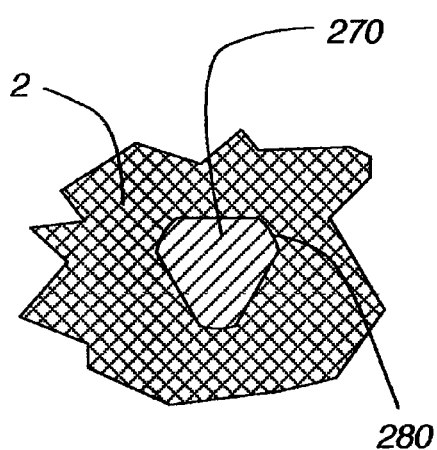
FIG. 35 is an enlarged cross-sectional plan view of the pin as taken along section line 35-35 in FIG. 34.
Figure 36:
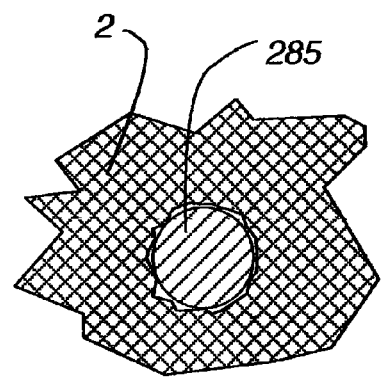
FIG. 36 is an enlarged cross-sectional plan view of the pin as taken along section line 36-36 in FIG. 34.

For a discussion of an embodiment of the pin 180 utilized on the pin rack 40, reference is made to FIGS. 33-36. FIG. 33 is an enlarged cross-sectional elevation of the pin rack 40 and fabric 2 impaled thereon. FIG. 34 is an enlarged cross-sectional elevation of a pin 180 as taken along section line 34-34 in FIG. 33. FIG. 35 is an enlarged cross-sectional plan view of the pin 180 as taken along section line 35-35 in FIG. 34. FIG. 36 is an enlarged cross-sectional plan view of the pin 180 as taken along section line 36-36 in FIG. 34.

In one embodiment, as shown in FIGS. 33-36, to further facilitate the removal of the downstream fabric strip 4" from the vacuum belt 34, the pin 180 has an enlarged cross-section 270 immediately adjacent its extreme upward tip 275. As illustrated in FIG. 35, the enlarged cross-section 270 has a shape that is generally triangular with flattened edges 280. As indicated in FIG. 34, the enlarged cross-section 270 tapers until it transitions into a cylindrical section 285, the cross-section of which is illustrated in FIG. 36. The enlarged cross-section 270 helps to draw the downstream fabric strip 4" from the vacuum belt 34 by providing increased frictional contact between the pin 180 and the fabric strip 4".

Although various embodiments of this invention have been described above with a certain degree of particularity or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. An apparatus for forming a fabric for an architectural opening covering, the apparatus comprising:
    a joining section configured to join together first, second, third and fourth material strips into a fabric strip where each of said material strips has top and bottom sides and front and rear edges and wherein the fabric strip has the top side of the rear edge of said first material strip secured to the bottom side of the front edge of said second material strip, said second material strip has the bottom side of its rear edge secured to the top side of the rear edge of said third material strip and the fourth material strip has the top side of its front edge secured to the bottom side of the rear edge of said third material strip;
    an accumulator configured to accumulate the fabric strip upon leaving the joining section;
    a cutting station configured to sever the fabric strip into an upstream fabric strip and a first downstream fabric strip; and
    a stacker configured to join the first downstream fabric strip with a second downstream fabric strip to form the fabric.

2. The apparatus of claim 1, wherein the joining section comprises first, second, third and fourth rollers for holding, respectively, rolls of the first, second, third and fourth material strips.

3. The apparatus of claim 1, wherein the joining section comprises a joining roller about which the first, second, third and fourth material strips are joined together to form the fabric strip.

4. The apparatus of claim 3, wherein the joining section comprises a glue station for applying a glue bead to the first material strip prior to said strip encountering the joining roller.

5. The apparatus of claim 3, wherein the joining section comprises a glue station for applying a pair of glue beads to the second material strip prior to said strip encountering the joining roller.

6. The apparatus of claim 3, wherein the joining section comprises a glue station for applying a glue bead to the fabric strip upon leaving the joining roller.

7. The apparatus of claim 1, wherein the cutting station comprises an air jet nozzle for applying a flow of air against the fabric strip.

8. The apparatus of claim 7, wherein the cutting station further comprises a knife and a knife block, and the flow of air maintains the fabric strip against the knife block.

9. The apparatus of claim 1, wherein the stacker comprises a vacuum belt for transporting the first downstream fabric strip.

10. The apparatus of claim 1, wherein the stacker comprises an elevator for bringing the second fabric strip into contact with the first fabric strip.

11. The apparatus of claim 1, wherein the stacker comprises a pin rack for impaling the fabric strips together as they bond to form the fabric.

12. A method of forming a fabric for an architectural opening covering, the method comprising:
    joining together first, second, third and fourth material strips into a fabric strip where each of said material strips has top and bottom sides and front and rear edges and wherein the fabric strip has the top side of the rear edge of said first material strip secured to the bottom side of the front edge of said second material strip, said second material strip has the bottom side of its rear edge secured to the top side of the rear edge of said third material strip and the fourth material strip has the top side of its front edge secured to the bottom side of the rear edge of said third material strip;
    accumulating the fabric strip as the fabric strip leaves the joining section;
    severing the fabric strip into an upstream fabric strip and a first downstream fabric strip; and
    stacking the first downstream fabric strip with a second downstream fabric strip to form the fabric.

13. The apparatus of claim 10 wherein the bottom side of the front edge. of said third material of said first fabric strip is secured to the top side of the front edge of said second material strip of said second fabric strip in said stacker.

14. The method of claim 12, further comprising providing the first, second, third and fourth material strips, respectively, on first, second, third and fourth rolls.

15. The method of claim 12, further comprising joining the first, second, third and fourth material strips about a joining roller to form the fabric strip.

16. The method of claim 15, further comprising applying a glue bead to the first material strip prior to said strip encountering the joining roller.

17. The method of claim 15, further comprising applying a pair of glue beads to the second material strip prior to said strip encountering the joining roller.

18. The method of claim 15, further comprising applying a glue bead to the fabric strip upon the fabric strip leaving the joining roller.

19. The method of claim 12, further comprising applying a flow of air against the fabric strip.

20. The method of claim 19, wherein the flow of air maintains the fabric strip against a knife block.

21. The method of claim 12, further comprising transporting the first downstream fabric strip via a vacuum belt.

22. The method of claim 12, further comprising elevating the second fabric strip into contact with the first fabric strip.

23. The method of claim 12, further comprising impaling the fabric strips together as they bond to form the fabric.

24. The method of claim 22 further including the step of securing the bottom side of said front edge of the third material strip of said first fabric strip to said top side of said front edge of said second material strip of the second fabric strip when said second fabric strip is elevated into contact with the first fabric strip.

* * * * *